US012398478B2

(12) United States Patent
Hryn et al.

(10) Patent No.: US 12,398,478 B2
(45) Date of Patent: Aug. 26, 2025

(54) METHOD AND SYSTEM FOR PREPARATION OF A NANOWIRE COMPOSITE BASED ON ELECTROPLATING

(71) Applicant: UCHICAGO ARGONNE, LLC, Chicago, IL (US)

(72) Inventors: John Hryn, Hawthorn Woods, IL (US); Yuepeng Zhang, Naperville, IL (US); Yunsong Xie, Austin, TX (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 535 days.

(21) Appl. No.: 16/437,813

(22) Filed: Jun. 11, 2019

(65) Prior Publication Data

US 2020/0392635 A1 Dec. 17, 2020

(51) Int. Cl.

*C25D 1/00* (2006.01)
*C25D 3/02* (2006.01)
*H01F 41/02* (2006.01)

(52) U.S. Cl.

CPC ............... *C25D 3/02* (2013.01); *C25D 1/006* (2013.01); *H01F 41/0253* (2013.01)

(58) Field of Classification Search

None

See application file for complete search history.

(56) References Cited

U.S. PATENT DOCUMENTS

| | | | | |
|---|---|---|---|---|
| 4,406,753 A * | 9/1983 | Blake | C25C 7/08 | 204/212 |
| 7,211,175 B1 * | 5/2007 | Mayer | C25D 21/12 | 204/224 M |
| 2004/0259365 A1 * | 12/2004 | Komai | H01L 21/32125 | 438/691 |

(Continued)

FOREIGN PATENT DOCUMENTS

| | | | |
|---|---|---|---|
| DE | 102017104905 A1 * | 9/2018 | C30B 7/12 |
| KR | 20080042225 * | 5/2008 | C25D 11/005 |
| KR | 20140073475 * | 6/2014 | C25D 11/02 |
| WO | WO-2017037757 A1 * | 3/2017 | C23C 18/31 |

OTHER PUBLICATIONS

Gael, “Microwave devices based on unbiased tunable ferromagnetic nanowire arrays”, Prom.: Piraux, Luc; Huynen, Isabelle, 2014. (Year: 2014).*

(Continued)

*Primary Examiner* — Stefanie S Wittenberg
(74) *Attorney, Agent, or Firm* — MARSHALL, GERSTEIN & BORUN LLP

(57) ABSTRACT

A system for fabricating anisotropic magnetic nanowire composites includes a chamber for containing an ionic fluid. A hole in a wall of the chamber allows for the ionic fluid to be in contact with a porous template outside of the chamber, and a cathode and an anode provide an electric field across the ionic fluid and porous template. The electric field causes ionic materials in the ionic fluid to migrate into the pores of the porous template, therefore plating nanowires in the porous template. Constant distances and positions of the (Continued)

anode, cathode, a reference probe, and a stirring element allow for the fabrication of longer, more uniform nanowires, and for the generation of consistent magnetic nanowire composites across multiple fabrication sessions.

19 Claims, 15 Drawing Sheets

(56) References Cited

U.S. PATENT DOCUMENTS

| | | | | |
|---|---|---|---|---|
| 2005/0082174 | A1* | 4/2005 | Kendig | G01N 17/02<br>205/775.5 |
| 2008/0187764 | A1* | 8/2008 | Jung | H01L 51/441<br>428/419 |
| 2009/0255820 | A1* | 10/2009 | Buttard | C25D 7/12<br>205/123 |
| 2011/0171137 | A1* | 7/2011 | Patolsky | C25D 5/10<br>424/9.3 |
| 2013/0045416 | A1* | 2/2013 | Seferos | C25D 5/12<br>429/209 |
| 2014/0374268 | A1* | 12/2014 | Wu | C25D 5/02<br>205/118 |
| 2017/0025729 | A1 | 1/2017 | Chen et al. | |

OTHER PUBLICATIONS

Gupta et al. "Enhanced field emission from copper nanowires synthesized using ion track-etch membranes as scaffolds" Journal of Materials Science: Materials in Electronics, 2018, 29, 19013-19027 (Year: 2018).*

Kerckhoven et al., "Substrate integrated waveguide isolator based on ferromagnetic nanowires in porous alumina template." Appl. Phys. Lett. 105, 183107 (2014).

Hamoir et al., "Self-biased nonreciprocal microstrip phase shifter on magnetic nanowired substrate suitable for gyrator applications," *IEEE Transactions on Microwave Theory and Tech.* 60 (7), 2152-2157 (2012).

De La Torre Medina et al., "Double ferromagnetic resonance and configuration-dependent dipolar coupling in unsaturated arrays of bistable magnetic nanowires," *Phys. Rev. B* 81, 144411 (2010).

Carignan et al., "Ferromagnetic Nanowire Materials: Theory and Applications," *IEEE Trans. Microwave Theo. Tech.* 59, 2568 (2011).

Aslam et al., "Microwave monolithic filter and phase shifter using magnetic nanostructures," *AIP Adv.* 8, 056624 (2018).

Kou et al., "Tunable ferromagnetic resonance in NiFe nanowires with strong magnetostatic interaction," *Appl. Phys. Lett.* 94, 112509 (2009).

Kou et al., "Microwave Permeability and Tunable Ferromagnetic Resonance in Cobalt Nanowire Arrays," *IEEE Trans. Magn.* 46, 1143 (2010).

Pan et al., "Microwave absorption properties of the Ni nanofibers fabricated by electrospinning," *Appl Phys A* 113, 755 (2013).

Darques et al., "Microwave circulator based on ferromagnetic nanowires in an alumina template," *Nanotechnology*, 21 (2010).

Caloz et al., "Recent Advances in Micro-structured Electric and Nano-Structured Magnetic Microwave Metamaterials," *IEEE* (2010).

* cited by examiner $K_U$ - Magnetocrystalline anisotropy $M_S$ - Saturation magnetization

METHOD AND SYSTEM FOR PREPARATION OF A NANOWIRE COMPOSITE BASED ON ELECTROPLATING

STATEMENT REGARDING FEDERALLY SPONSORED RESEARCH OR DEVELOPMENT

This invention was made with Government support awarded by Defense Advanced Research Projects Agency (DARPA). This invention was made with government support under Contract No. DE-AC02-06CH11357 awarded by the United States Department of Energy to UChicago Argonne, LLC, operator of Argonne National Laboratory. The government has certain rights in the invention. This draft has been cleared by DARPA for unlimited public distribution (Distributions Statement "A"—Approved for Public Release, Distribution Unlimited).

FIELD OF THE DISCLOSURE

The present disclosure relates to a method and system for electroplating nanowires and, in particular, for fabricating high-uniformity nanowire composites for use in self-biased miniaturized radio frequency devices working in frequency working in a frequency range of 5 GHz to 30 GHz.

BACKGROUND

Nanowires are cylindrical or wire-like structures with diameters on the order of a nanometer. Soft magnetic nanowires are a unique group of nanowires that can reserve magnetization after the external magnetic field is removed due to their high length-to-diameter aspect ratio. Also based on this aspect ratio, the nanowires can exhibit anisotropic magnetic and electrical properties along their long axial direction. Such self-biased magnetic properties make soft magnetic nanowires a desirable magnetic component in self-biased radio frequency (RF) devices, such as non-reciprocal devices (e.g., circulators, isolators) and non-linear devices (such as signal-to-noise enhancers). Although this concept has been proposed in the past, the control of magnetic properties and growth uniformity of magnetic nanowires has been challenging. Non-uniformity in nanowire length, composition and/or microstructure can cause large loss in RF devices when they interact with electromagnetic waves. A high degree of alignment of nanowires is also important to provide a collaborative response and low RF loss. In addition, large nanowire height allows for uniform and strong self-biased magnetic field, and thus large microwave interaction effects, such as isolation of an RF circulator device Based on the above features, soft magnetic nanowires can be good passive (i.e., self-biased) RF components. This eliminates the need for bulky permanent magnets used to provide a required magnetic field to the traditional field-dependent magnetic component in RF devices. Thus, the nanowire-based self-biased devices can be miniaturized and integrated into wafers and monolithic microwave integrated circuits (MMICs), which further reduces the size, weight, and power consumption of MMICs. The low power consumption attribute is particularly favorable for defense applications (e.g., sensors, autonomous devices, and hand-held RF devices) as well as 5G telecommunication technologies.

The prior art of magnetic components in RF devices relies on external magnetic fields provided by permanent magnets, which is bulky and consumes power. These materials are ferrite (e.g., $CoFe_2O_4$, $Mn_aZn_{(1-a)}Fe_2O_4$, $Ni_aZn_{(1-a)}Fe_2O_4$), garnets (e.g., yttrium iron garnet) and FeGaB. Some hexagonal ferrites that can have magnetic anisotropy and remanent magnetization, such as $BaFe_{12}O_{19}$, $SrFe_{12}O_{19}$ and their derivatives like $Ba_3Co_2Fe_{24}O_{41}$ and $Ba_2Co_2Fe_{12}O_{22}$, have been developed to serve as self-biased magnetic components. However, the ferrites have a high ferromagnetic resonance frequency above 30 GHz, which makes them not suitable for RF devices working below 25 GHz.

Anisotropic soft magnetic nanowires, such as Fe, FeCo, Co, FeNi, CoNi, FeCoNi, and FeCoCu nanowires, are so far the only magnetic material solution for self-biased RF devices working in the 5-25 GHz frequency range, e.g., from C-band to Ka band. It is very useful to develop an efficient, accurate and repeatable fabrication method to grow well aligned soft magnetic nanowires.

Nanowires can be synthesized in either a top-down approach or a bottom-up approach. Top-down approaches reduce bulk pieces of materials into nanowires through lithography, etching, or other methods. Bottom-up approaches synthesize nanowires using deposition, growth techniques, and other methods. Electroplating is a bottom-up approach to synthesizing nanowires. Electroplating is a method used to grow highly aligned, nanowires with the assistance of a porous template. Electroplating is a low-cost efficient method for fabricating nanowires but lacks repeatability control, nanowire length control, control of nanowire uniformity, and control of tuning alloy composition during nanowire growth. The commonly reported nanowire issue regarding electroplating is electroplating nanowires with a short nanowire length, often resulting from non-uniform nanowire growth in porous templates, where some nanowires grow faster reaching the template surface before other nanowires, leading to surface deposition, and thus preventing other nanowires from continuous growth.

SUMMARY OF THE DISCLOSURE

A system for making aligned magnetic nanowire arrays includes a chamber to confine an ionic fluid. The chamber has a perimeter wall and a bottom wall with an aperture on the bottom wall providing fluid communication between an interior of the chamber and an exterior surface of the bottom wall. The system further includes a porous with one side (i.e., first side) of the porous template exposed to an ionic fluid present in the chamber through the aperture on the bottom wall of the chamber, and the other side (second side) of the porous template is coated with a conductive metal layer and attached to a cathode against a separate supporting plate. An anode is disposed within the chamber at a constant distance from the first side of the porous template; and a reference electrode is fixed at a distance from the porous template, disposed inside of the chamber through a port in the perimeter wall of the chamber. The system further includes a stirring element inside of the chamber fixed at a constant distance from the porous template and physically coupled to a motor configured to cause the stirring element to rotate at a constant speed. The system further includes a cathode in contact with a second side of the porous template opposite the first side of the porous template. In embodiments, the system may further include a supporting plate that supports the cathode and porous template. This separate supporting plate is screwed to the main chamber. In embodiments, an O-ring is mounted in between the supporting template and the exterior of the bottom wall of the main chamber to prevent leaking of the ionic fluid from the interface of the supporting plate and main chamber bottom wall. The first and second sides of the porous template being planar. A voltage source may be electrically coupled to the anode and to the cathode configured to apply a voltage across the anode and the cathode, with the voltage source controlled according to a feedback signal received from the reference electrode. In some embodiments, the voltage source is applied to the cathode and anode through a conductive path that can be either an electrical lead or electrical transmission lines such as metal strips or pre-printed metal lines.

In embodiments, a mask plate may be used to define the plating area size and shape. The mask and plating area size can be smaller than the template surface area and shape can be different from the template shape. In embodiments, the mask plate is mounted on top of the porous template and is fastened onto the supporting plate by screws. The shape and size of the exposing area of the mask (i.e., the area that exposes the porous template to the ionic fluid) can vary based on the application needs. In embodiments with a mask plate, an O-ring may be attached in between the mask plate and the porous template to prevent the ionic liquid from leaking out from the interface of the mask and porous template. The mask plate may also serve the role of securing the porous template against the wall of the supporting plate so that the porous template does not move. In embodiments, the mask plate has a round hole to define a circular plating area for usage in a round-shape circulator.

A method of making aligned magnetic nanowire components, using a system for making magnetic nanowire components, including preparing a porous template, cleaning the pores of the porous template, placing an ionic fluid in a chamber of the system, applying a voltage across an anode and a cathode of the system, monitoring the applied voltage with a reference electrode, and stirring the ionic fluid at a controlled constant speed.

DETAILED DESCRIPTION

Figure 1A:
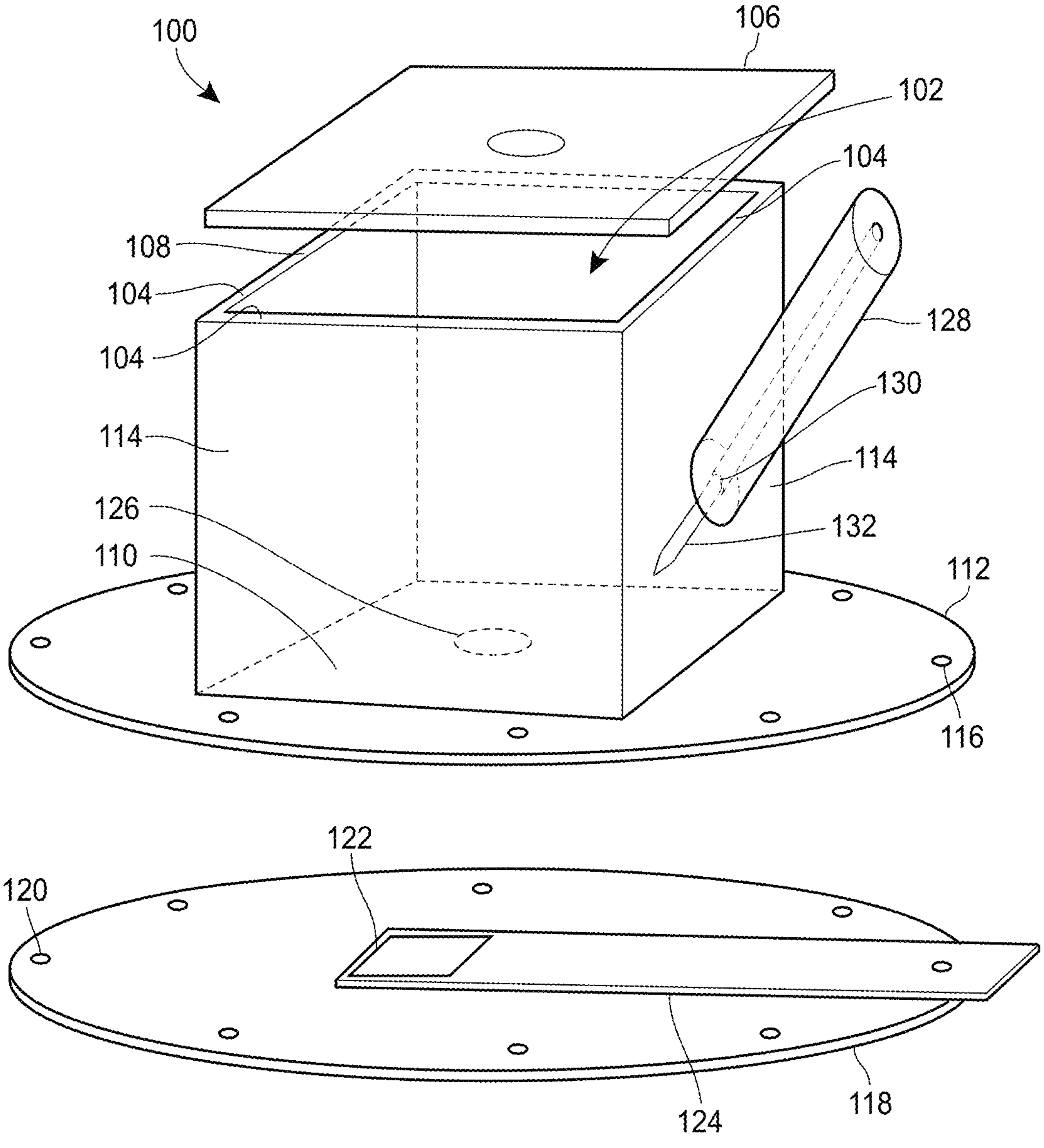
FIG. 1A, is a perspective view of a chamber portion of a system for fabricating nanowires.

Passive radio-frequency (RF) components have the advantages of smaller size, lower power consumption, and on-chip packaging potential. Passive RF components are used in radar technologies, satellite communication systems, hand-held communication devices, and ad-hoc network products. Anisotropic magnetic nanowire (AMN) based composite materials can serve as a magnetic field source for miniaturized passive RF devices. The capability to tailor an AMN composite's magnetization, ferromagnetic resonant frequency (FMR), FMR linewidth (ΔH), and dielectric properties is essential to fabricating RF devices operational at frequency bands of interest.

One example of a passive RF component is a non-reciprocal passive circulator. Widely used in the RF device industry, circulators enable a single antenna to both transmit and receive signals simultaneously. Typically, bulky external magnets bias ferrite disks in circulators that operate at RF frequencies, resulting in larger RF circulator components. Hexagonal ferrites that can reserve magnetization without external magnets are proposed for miniaturized passive RF devices. However, due to the high ferromagnetic resonance (FMR) frequency of ferrites, ferrite self-biased circulators operate at frequencies in the K band (18-26 GHz), and higher. In addition, when ferrites are used for relatively low frequency (e.g., in K band), their bandwidth is very narrow. This is not desirable for radar and other RF communication applications. Currently, there is lack of self-biased ferrite alternatives that can drive passive RF devices at, and below, the Ka band. So far, the AMN composites developed using the nanowires fabrication method claimed herein are the only solution for fabricating passive RF devices that work in the frequency range from 5-25 GHz. The methods and devices described herein facilitate fabrication of compact, self-biased ferromagnetic circulators for use in RF technologies, and in particular RF technologies that operate from the C- to the K-band.

Magnetic nanowires can be plated into porous template materials, such as anodic aluminum oxide (AAO), to form aligned AMN composites. Due to the high aspect ratio (length-to-diameter ratio) of magnetic nanowires, magnetic shape anisotropy can generate remanent magnetization and coercivity of the AMN composites. Depending on the nanowire composition in AMN composite materials, the AMN composite FMR can range from 10 to 25 GHz for FeNi and FeCo nanowires. Additionally, the FMR line width, saturation magnetization, remanent magnetization, self-biased field, and dielectric properties may all be tuned to fabricate RF devices that operate at desired frequencies and bandwidths with small loss. The methods and devices disclosed also provide a means for generating AMN composites with greater nanowire uniformity, resulting in large nanowire length and narrower FMR linewidths, which is often desirable for RF components and devices. The methods and devices disclosed herein provide a means for tuning the magnetic and microwave behavior of AMN composites across a wide range, for passive RF devices operating from the C- to the Ka-band. The methods and devices disclosed may be useful in the next generation of radar, satellite, and 5G wireless technologies.

Figure 1B:
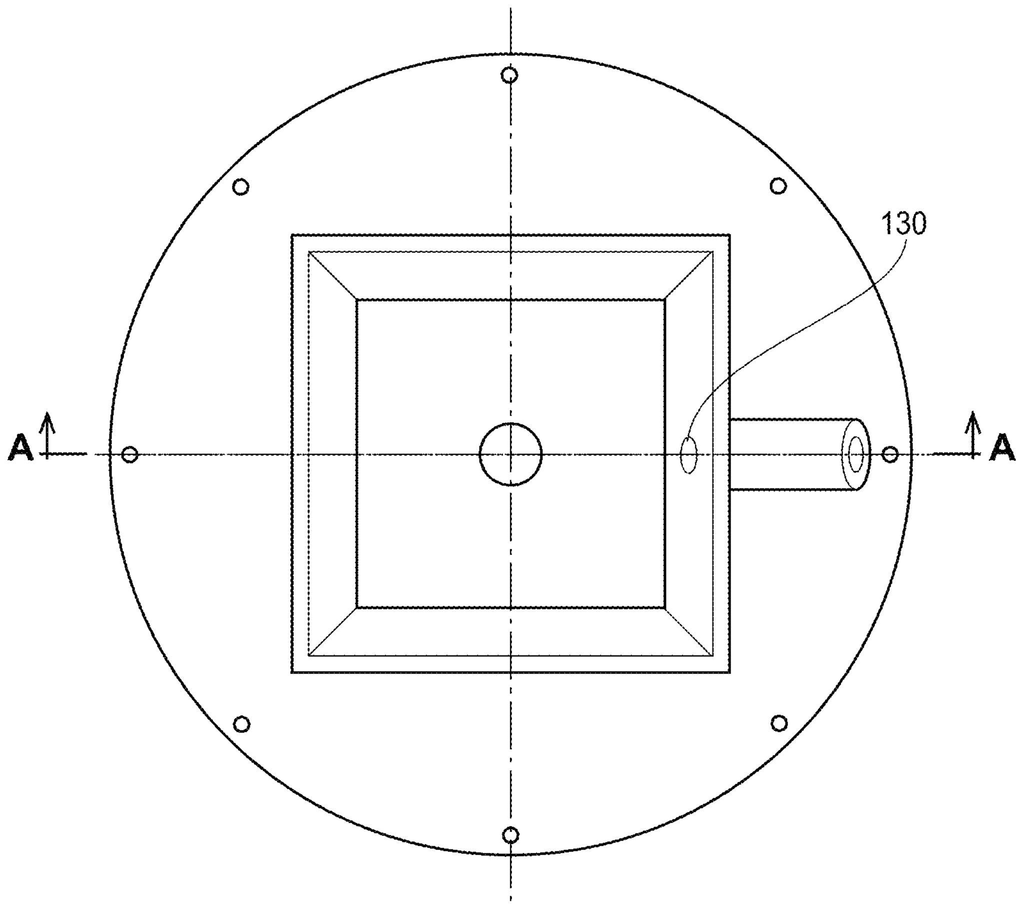
FIG. 1B, is a top plan of a chamber portion of a system for fabricating nanowires.
Figure 1C:
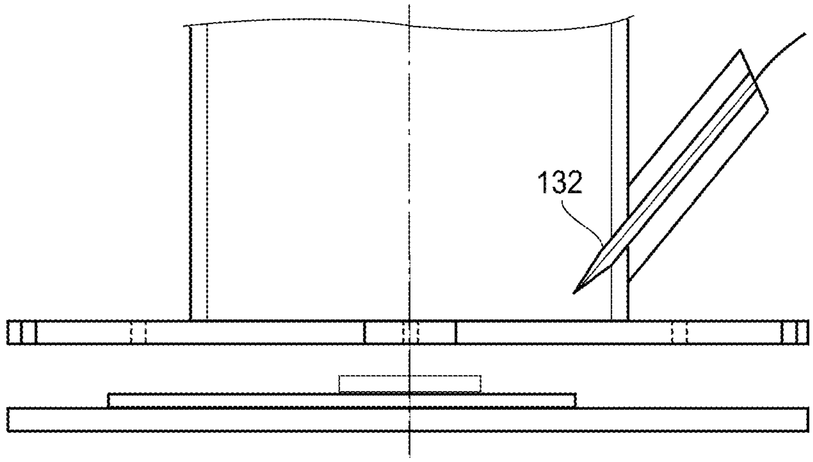
FIG. 1C, is a front elevation cross-sectional view of a chamber portion of a system for fabricating nanowires.

FIGS. 1A, 1B, and 1C are perspective, top plan, and front elevation cross-sectional (along A-A) views, respectively, of a chamber portion 100 of a system for fabricating nanowires and nanowire composites. The chamber portion 100 includes a chamber 102 bounded by one or more perimeter walls 104, depending on the shape of the chamber 102. Specifically, a cylindrical chamber 102 may have a single perimeter wall 104, while a cuboid (i.e., rectangular parallelepiped) chamber 102, as depicted in FIG. 1, may have four perimeter walls 104. In an embodiments, an optional chamber cover 106, integrated with a motor, a shaft, a stirring element, an anode metal plate and electrical lead. The optional chamber cover 106 may be sized to be securely fixed to the top 108 of the chamber 102 in order to enclose the chamber 102 and secure other portions of the system (e.g., a motor, shaft, stirring element, anode, and/or electrical lead) to the chamber 102, as described below. A bottom wall 110 of the chamber 102 may include a flange 112 that, with the bottom wall 110, may be integrally formed with the perimeter walls 104 to form the chamber 102, or may be glued, soldered, welded, riveted, fused, or otherwise physically coupled to the perimeter walls 104.

The flange 112 may extend beyond exterior surfaces 114 of the perimeter walls 104 and may include a plurality of fastener apertures 116 or other means for securing the chamber 102 to an attachable plate 118 via corresponding fastener apertures 120 on the attachable plate 118. The attachable plate 118 and the flange 112, when securely coupled to one another, for example by inserting bolts through the fastener apertures 116, 120, cooperate to hold in place a porous template 122 and a cathode 124.

During operation, the cathode 124 and the porous template 122 are placed between the attachable plate 118 and the combined bottom wall 110 and flange 116 such that the porous template 122 is held against an aperture 126 in the bottom wall 110 of the chamber 102. As will be described in further detail below, the porous template 122 is exposed to an ionic solution in the chamber 102 through the aperture 126 in the bottom wall 110. The cathode 124 cooperates with an anode (described below) and a stirring element (described below) to cause magnetic nanowires to form in the pores of the porous template 122.

In embodiments, the chamber 102 includes a port 128 having a corresponding aperture 130 that facilitates insertion of a probe 132 (also referred to as a reference electrode) into the chamber 102 from outside the chamber 102. In particular, the probe 132 may be a voltage probe configured to measure a reference electrical field at a fixed location within the chamber 102. Correspondingly, then, the port 128 is preferably configured to cooperate with the probe 132 to repeatably and consistently position the probe 132 in a same, fixed position when the probe 132 is inserted into the chamber 102. In embodiments, a tip of the probe 132 extends to a fluid-filled space between the cathode 124 and the anode.

The chamber portion 100 and the attachable plate 110 may each be formed from non-metallic substances by machining, additive manufacturing, or the like. Additionally, while FIGS. 1A-1C depict a single aperture 126 in the bottom wall 110 of the chamber 102, the number of apertures 126 is selectable according to the desired number of AMN composite components to be created during a given execution of the production method. Of course, when multiple apertures 126 are included in the bottom wall 110, the side of the porous template 122 and the electrode 125 should be sized such that the porous template 122 (or multiple porous templates 122) is (are) exposed through each of the apertures 126, and such that the cathode 124 extends at least under the porous template 122 over the area of each of the apertures 126.

Figure 2A:
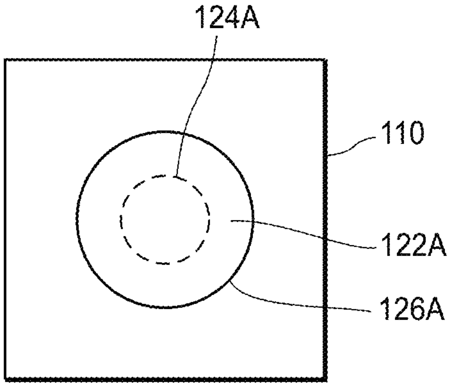
FIG. 2A depicts a top plan view of a bottom wall with a single aperture circular and circular cathode.

It should be understood that the size and shape of an AMN composite fabricated using the devices and methods described herein may be regulated by the size and shape of the aperture 126, but could alternatively or additionally be regulated by the size, shape, and position of a mask plate (e.g., the mask plate 204 described further in reference to FIG. 4A), or by the size, shape, and position of a cathode. In embodiments that employ a cathode to define the size and shape of an AMN composite, the cathode may be a conductive layer deposited on a side of the porous template 122. FIGS. 2A-2D depict different possible configurations illustrating this point. Each of FIGS. 2A-2D depicts a top plan view of the bottom wall 110. In FIG. 2A, the bottom wall 110 includes a single aperture 126A, similar to the embodiments in FIGS. 1A-1C. However, in contrast with the embodiments depicted in FIGS. 1A-1C, in the embodiment depicted in FIG. 2A a cathode 124A, or a conductive layer, does not extend beyond the boundaries of the aperture 126A, but instead is sized and disposed to create an AMN composite roughly in the center of the aperture 126A. That is, while, in the embodiment of FIGS. 1A-1C, the size and shape of a resulting AMN composite is dictated by the size and shape of the aperture 126, in the embodiment depicted in FIG. 2A, the size and shape of a resulting AMN composite is dictated by the size and shape of the cathode 124A, or conductive layer, positioned beneath a porous template 122A exposed through the aperture 126A.

Figure 2B:
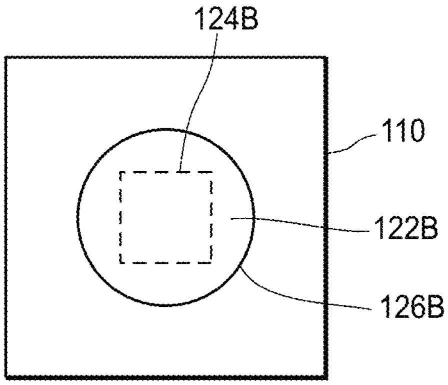
FIG. 2B depicts a top plan view of a bottom wall with a single circular aperture and a circular cathode.
Figure 2C:
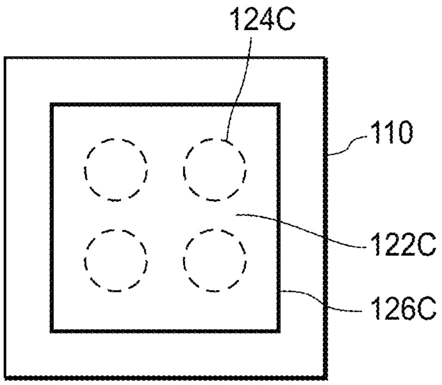
FIG. 2C depicts a top plan view of a bottom wall with a single rectangular aperture and four circular cathodes.
Figure 2D:
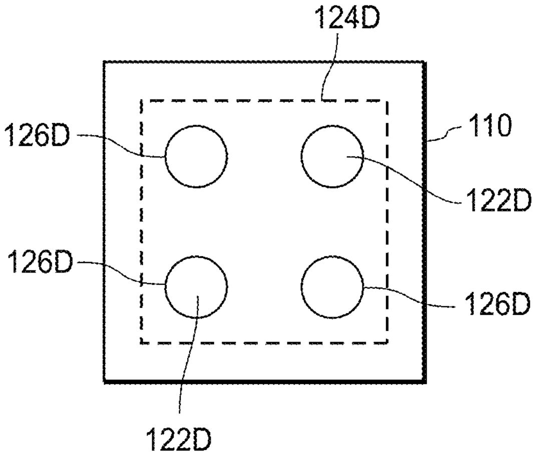
FIG. 2D depicts a top plan view of a bottom wall with a four circular apertures and a single rectangular cathode.

FIGS. 2B-2D further illustrate this principle. In FIG. 2B, a circular aperture 126B exposes a porous template 122B. However, beneath the porous template 122B, a rectangular cathode 124B, or conductive layer, would result in a corresponding rectangular AMN composite forming in the porous template 122B. In FIG. 2C, a single rectangular aperture

126C exposes a porous template 122C. Four circular cathodes 124C, or conductive layers, positioned beneath the porous template 122C but within the area of the porous template 122C exposed by the aperture 126C would result in four circular AMN composite devices forming in the porous template 122C. In FIG. 2D, the bottom wall 110, or a mask plate such as the mask plate 204 described further in reference to FIG. 4A, includes four circular apertures 126D exposing a porous template 122D (or multiple porous templates 122D). A single cathode 124D, disposed beneath the porous template(s) 122D, or conductive layer deposited on the porous template, would result in four AMN composites being formed according to the size and shape of the apertures 126D. (Of course, multiple cathodes 124D, or conductive layers, could also be employed in this embodiment.) In embodiments, the bottom wall 110 may be selectively attachable to the perimeter walls 104 in a manner that is water-tight. In such embodiments, the bottom wall 110 may be replaced, for example, to provide an easy method of using a variety of "masks" having different patterns and numbers of apertures 126.

In embodiments, one or more thin conductive layers may be deposited onto a surface of the porous template 122 opposite the surface exposed to the chamber 102. An electrical connection may be made with the thin conductive layer(s) to allow the conductive layer(s) to act as the cathode 124 during fabrication. Deposition of a thin-conductive layer directly onto the porous template 122 localizes the applied electric field, and therefore, the plating of nanowires to the region of the porous template 122 directly between the thin-conductive layer, and an anode (discussed further below). The thin conductive layer deposited onto the porous template 122 may have a geometric shape for determining the shape of a magnetic nanowire composite fabricated according to the devices and methods disclosed herein. The thin conductive layer may exist on different regions of the porous template 122 so that multiple nanowire composites may be fabricated during a single nanowire fabrication session. In embodiments, the cathode 124 may be a filament, a foil, a plate, a thin film, a point, a disk, or another geometry or structure to provide a desired electric field in the chamber 102.

The chamber portion 100 is relatively static, having no moving parts and staying relatively fixed once the flange 112 is affixed to the attachable plate 118 and the reference probe 132 is inserted through the port 128. The chamber portion 100 is configured to cooperate with an immersion portion 150, depicted in a perspective view in FIG. 3A. The immersion portion 150 includes a motor 152, a driven shaft 154, a chamber cover 106, an anode 156, and a stirring element 158. The motor 152 operates to rotate the driven shaft 154 and the stirring element 158, the latter being a generally elongate member (e.g., a bar) fixed at the midpoint of its longitudinal axis to the driven shaft 154 such that the longitudinal axis of the stirring element 158 is generally orthogonal to the longitudinal axis of the driven shaft 154 and such that rotation of the driven shaft 154 results in corresponding rotation of the stirring element 158. The drive shaft is configured such that the driven shaft 154 passes through an aperture 164 in the chamber cover 106, the aperture 164 having a diameter exceeding that of the driven shaft 154 and matching the diameter of the cylindrical hollow body 160 such that the driven shaft 154 rotates freely. The anode 156 is disposed along the driven shaft 154 between the stirring element 158 and the motor 152. In the embodiment depicted in FIG. 3A, the anode 156 is fixedly coupled to a hollow body 160 through which the driven shaft 154 passes. The anode 156 may be coupled to a voltage source (not shown) by a wire (not shown) electrically coupled to the anode 156. Of course, while depicted as a hollow cylinder, the hollow body 160 may be any hollow three-dimensional body through which the driven shaft 154 may pass and to which the anode 156 may be fixed. The hollow body 160 may be supported by, or affixed to, the chamber cover 106, as depicted in FIG. 3A.

Figure 3A:
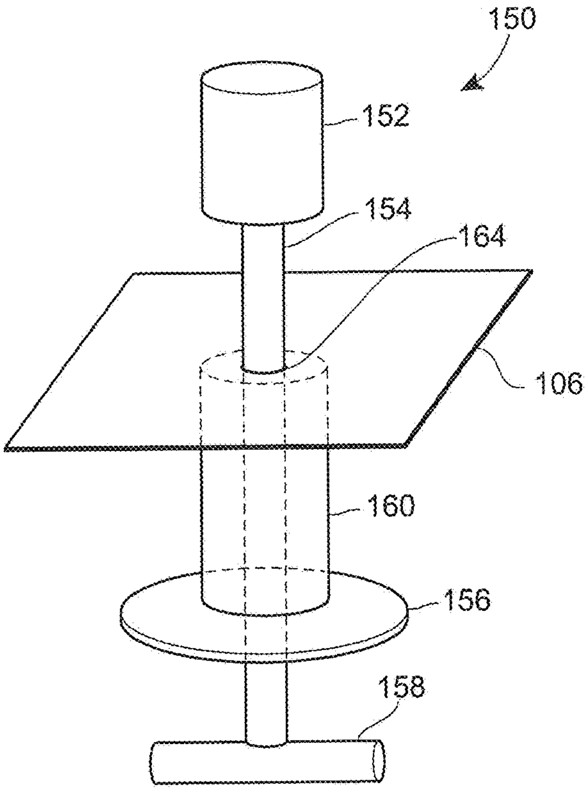
FIG. 3A is a perspective view of an immersion portion including a motor, drive shaft, chamber cover, anode, and a stirring element.

In embodiments, such as that depicted in FIG. 3A, the anode 156 is a disk. However, the anode 156 need not be a disk but may be multiple disks, a point anode such as the end of a wire, a rectangular or square plate, multiple rectangular or square plates, or other number of anodes and anode geometries capable of cooperating with the cathode 124 to provide a desired electrical field strength across the porous template 122.

Figure 3B:
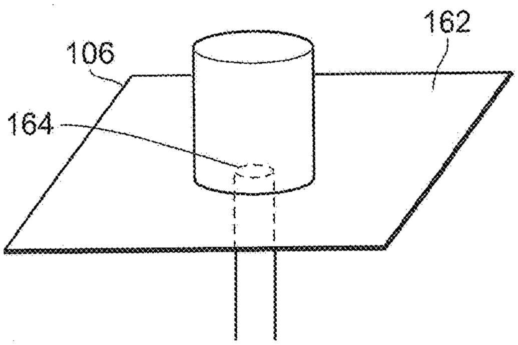
FIG. 3B depicts an immersion portion mounted on a chamber cover of a system for fabrication of nanowire composites including a motor and a drive shaft.
Figure 3C:
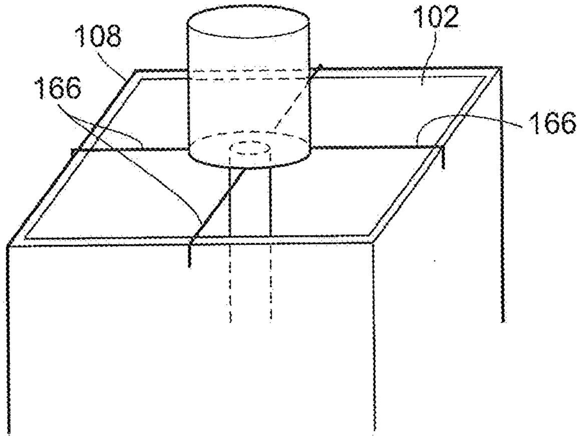
FIG. 3C depicts an immersion portion coupled to a chamber portion of a system for fabrication of nanowires including a drive shaft and a motor supported by a chamber cover that can cap the chamber portion, i.e, stand on top of the chamber.

The immersion portion 150 is configured to be coupled to the chamber portion 100 such that the immersion portion is partially immersed in a fluid disposed in the chamber 102. In embodiments, the motor 152 is configured to be mounted to a top surface 162 of the chamber cover 106, such that the driven shaft 154 passes through an aperture 164 in the chamber cover 106, as depicted in FIG. 3B. The cover 106 and immersion portion can be integrated by glue or made all at once by additive manufacturing. In still other embodiments, the motor 152 may be configured to be supported by the top 108 of the chamber 102, as depicted in FIG. 3C. For instance, brackets 166 may be fixedly mounted to the motor 152 to allow the motor 152 to perch atop the chamber 102 with the driven shaft 154 extending into the chamber 102 below. Either way, the hollow body 160 is generally supported either by the motor 152 or by the chamber cover 106, such that the hollow body 160 (and the anode 156 attached to it) remains stationary while the driven shaft 154 rotates within it. While not illustrated in FIGS. 3A-3C, it should be understood, that a power source provides power to the motor 152. The power source may be a battery, a power supply, or other power source mounted or affixed to the motor 152, chamber cover 106, or mounted remotely and electrically connected to the motor 152 by wires or electrical leads.

Figure 4A:
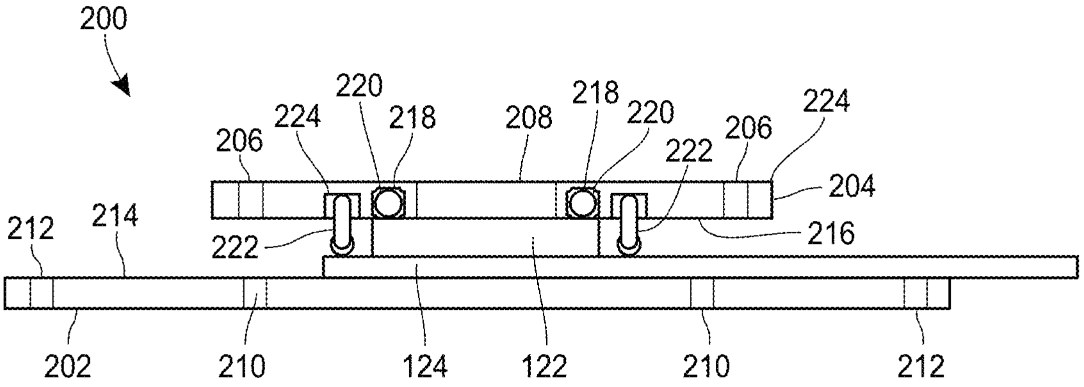
FIG. 4A is a cross sectional view of a template mounting assembly attached to a flange of a chamber.
Figure 4C:
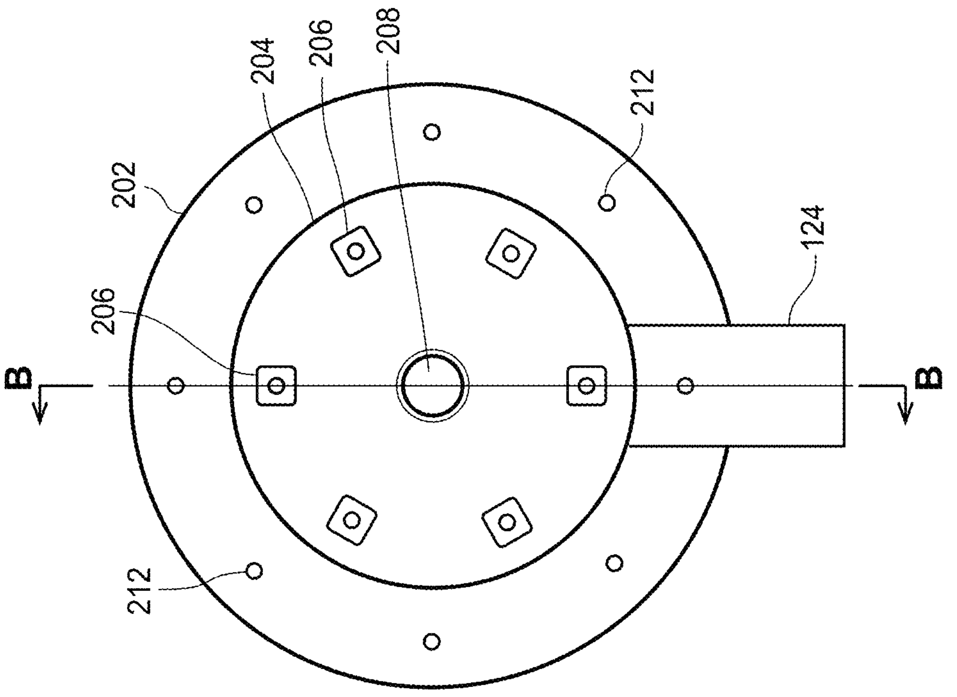
FIGS. 4B and 4C are top views of a template mounting assembly with a supporting plate and a top mounting mask plate.
Figure 4B:
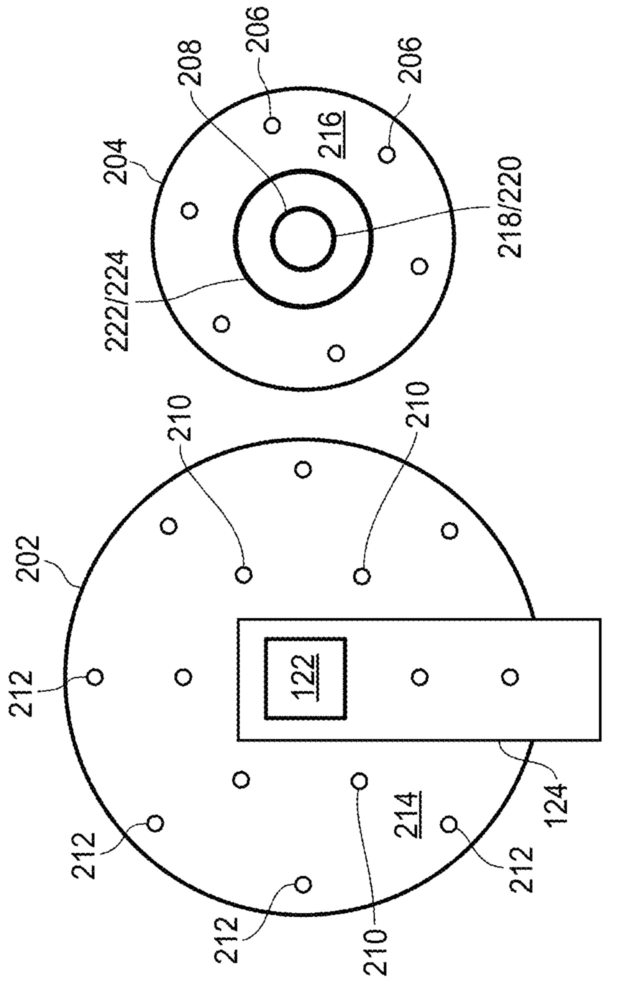

FIGS. 1A-1C depict an embodiment in which the porous template 122 and the electrode 124 are secured in place by the cooperation of the flange 112 and the attachable plate 118. FIGS. 4A-4C depict cross-sectional (along B-B) and top views of an alternative embodiment in which a template mounting assembly 200 may be secured to the flange 112, instead of the attachment plate 118 with the porous template 122 and the cathode 124. In the embodiments of FIGS. 4A-4C, the template mounting assembly 200 includes a supporting plate 202 and a top mounting mask plate 204. The top mounting mask plate 204 includes a plurality of peripheral fastener apertures 206 for mounting the top mounting mask plate 204 to the supporting plate 202, and one or more apertures 208 corresponding in size and shape to the aperture(s) 126 in the bottom wall 110 of the chamber 102. The size of the aperture 208 is generally smaller than the aperture 126 in the bottom wall 110. The aperture 208 is used to define the size and shape of the plating area according to an applications needs. In the embodiment, a circular shape aperture 208 is illustrated as demonstration for fabricating a round shape device.

The supporting plate 202 includes a plurality of inner fastener apertures 210 positioned and sized to cooperate with the peripheral fastener apertures 206 of the top mounting mask plate 204 such that the top mounting mask plate 204 and the supporting plate 202 can be secured to one another. The supporting plate 202 also includes a plurality of outer fastener apertures 212 positioned and sized to cooperate with the fastener apertures 116 of the flange 112 such that the template mounting assembly 200 may be secured to the flange 112.

The cathode 124 may be disposed on a top surface 214 of the supporting plate 202 and the porous template 122 disposed on the cathode 124. The porous template 122 and cathode 124 may be sandwiched between the top surface 214 of the supporting plate 202 and a bottom surface 216 of the top mounting mask plate 204, before the supporting plate 202 and the top mounting mask plate 204 are secured to one another.

The bottom surface 216 of the top mounting mask plate 204 may have a first annular channel 218 encircling the aperture 208, in which a primary O-ring seal 220 is disposed. The primary O-ring seal 220 may provide a seal between the porous template 122 and the top mounting mask plate 204 to prevent fluid from leaking from the chamber 202 around the porous template 122. In embodiments, a secondary O-ring seal 222 disposed in a second annular channel 224 provides a second barrier to prevent fluid from leaking from the chamber 202. The secondary O-ring seal 222 may engage the porous template 122 in some embodiments, while engaging the cathode 124 in other embodiments.

Figure 5A:
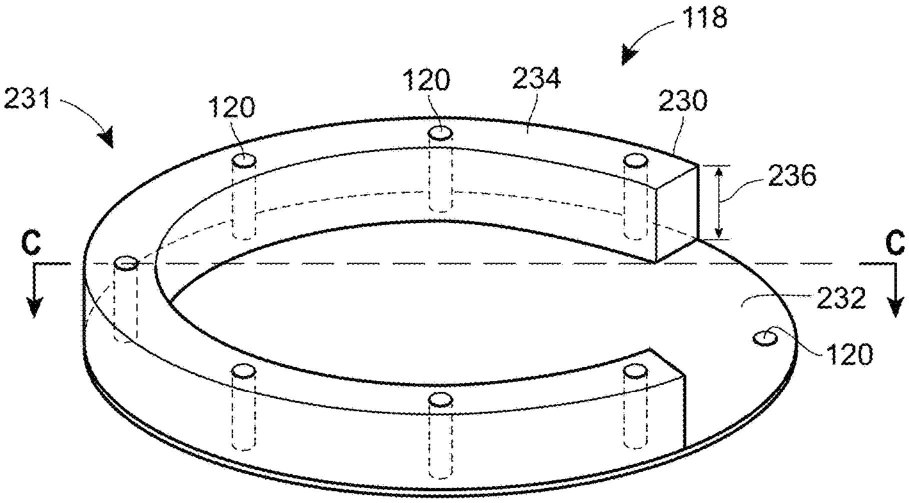
FIG. 5A is a perspective view of an attachable plate with a raised edge portion and a flat lower cradle.
Figure 5B:
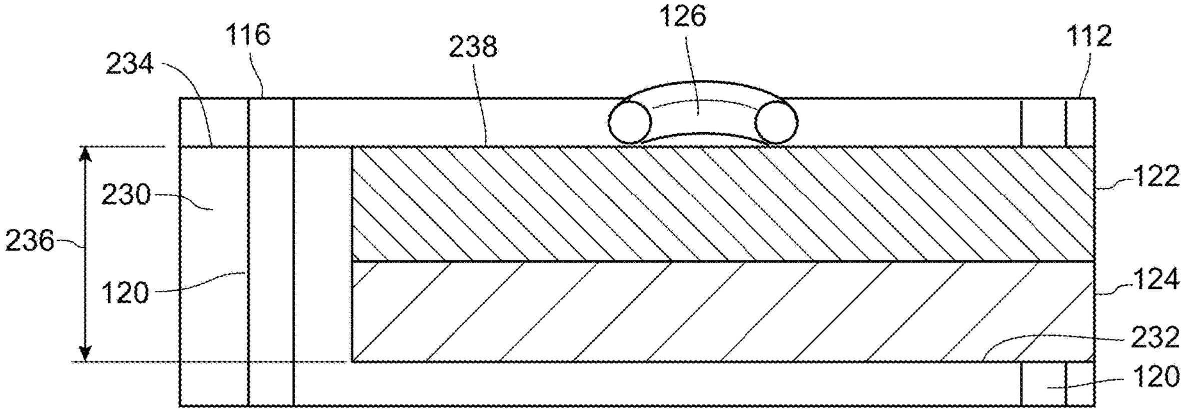
FIG. 5B is a cross-sectional view of an attachable plate with a raised edge portion, lower cradle, porous template, and a cathode.

In embodiments, the attachable plate 118 of FIG. 1A, or the supporting plate 202 of FIG. 4A, includes a raised edge portion 230 around a portion 231 of the perimeter, and the apertures 120 (in the case of the attachable plate 118) or 212 (in the case of the supporting plate 202) are disposed in, and extend through, the raised edge portion 230, as depicted in FIGS. 5A and 5B. FIG. 5A is a perspective view of an embodiment of the attachable plate 118. The attachable plate 118 has a flat lower cradle 232, and the raised edge portion 230 that protrudes from the flat lower cradle 232, a top surface 234 of the raised edge portion 230 being parallel to the flat lower cradle 232 and at a height 236 above the flat lower cradle 232. The raised edge portion 230 of the attachable plate 118 includes the apertures 120, having a size and placement on the raised edge portion 230 such that the apertures 120 align with the apertures 116 on the flange 112 (FIG. 1A) to attach the attachable plate 118 to the flange 112. As depicted in FIG. 5A, the flat lower cradle 232 may also have apertures 120 on areas of the lower cradle 232 to which the raised edge portion 230 does not extend.

FIG. 5B is a cross-sectional view of the attachable plate 118 taken along C-C in FIG. 5A, though FIG. 5B also depicts the cathode 124 and the porous template 122. As can be seen, the height 236 of the raised edge portion 230 above the flat lower cradle 232 is selected to correspond to the combined thickness of the cathode 124 and the porous template 122 such that, when the cathode 124 is placed on the lower cradle 232, and the porous template 122 is placed on top of the cathode 124, a top surface 238 of the porous template 122 is approximately at the same height as the top surface 234 of the raised edge portion 230. The attachable plate 118 may be attached to the flange 112 using fasteners as should be generally understood. When attached to the flange 112, the raised edge portion 230 of the attachable plate 118 is in direct contact with the flange 112. Typically, the porous template 122 is on the order of 100 pm thick and may be very brittle or easily damaged due to physical pressure, so the cooperation between the raised edge portion 230 and the flange 112 (in addition to the engagement of any O-ring seals that may be present in various embodiments) may prevent any damage to the porous template 122. The height 236 of the raised edge portion 230 depends on the combined thickness of the porous template 122 and the cathode 124. The height 236 of the raised edge portion 230 may be determined to allow for the cathode 124 and the porous template 122 to be contained between the lower cradle 232 and the flange 112, and provide a constant pressure between the cathode 122 and the porous template 122 (and any O-ring seals 126 present). The constant pressure ensures a uniform electric field across the porous template 122 allowing for higher uniformity in the fabricated nanowire composite devices.

Figure 6:
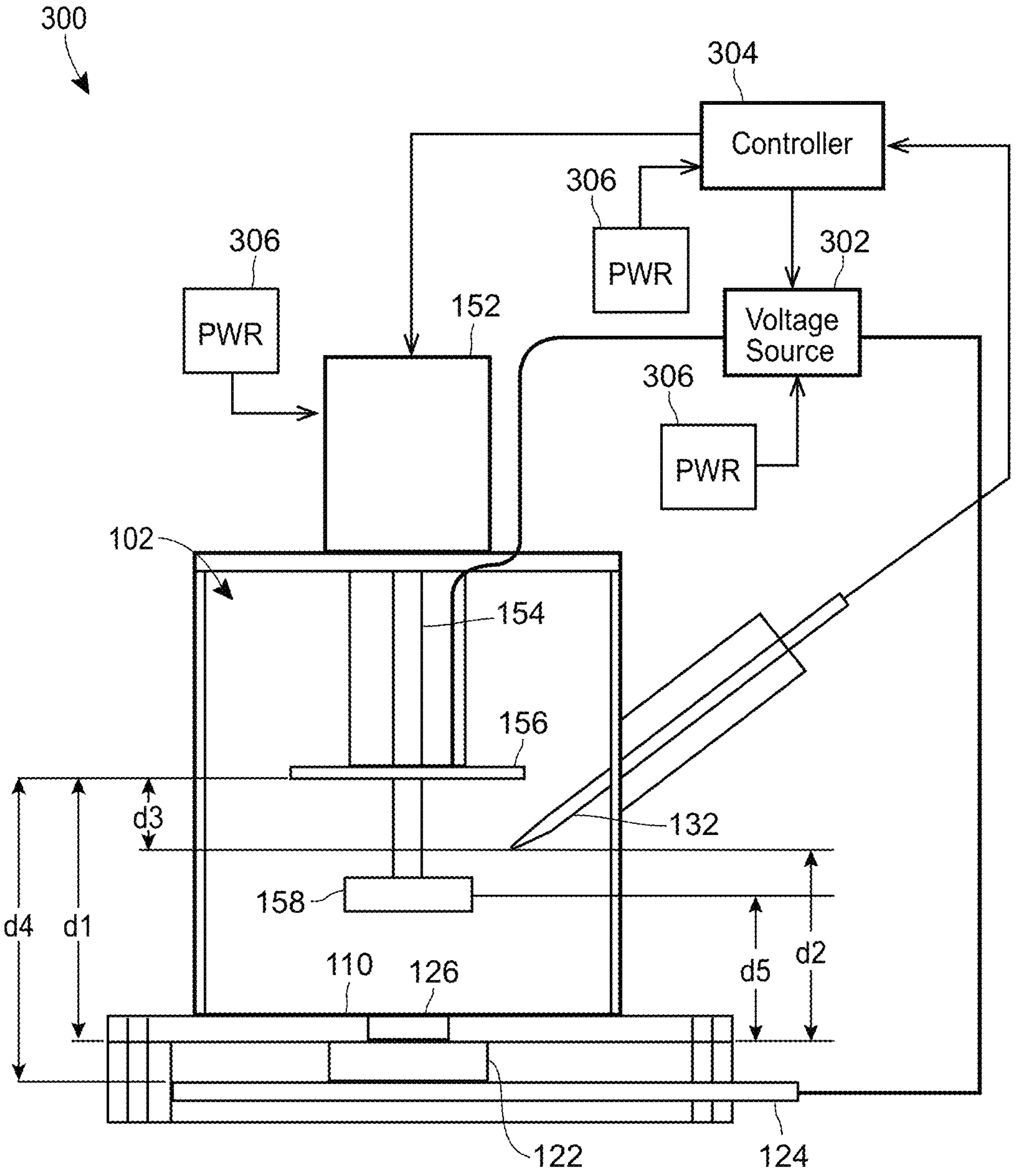
FIG. 6 depicts a system for fabricating nanowires with a chamber portion, immersion portion, controller (potentiostat), voltage source, and a probe (reference electrode).

Turning to FIG. 6, the chamber portion 100 is depicted combined with the immersion portion 150 and control and power components to form a magnetic nanowire component fabrication environment 300. A voltage source 302 electrically coupled to the anode 156 and to the cathode 124 provides a controllable voltage between the anode 156 and the cathode 124. A controller 304 (e.g., a potentiostat, bipotentiostat, polypotentiostat, etc.) is communicatively coupled to the probe 132 (e.g., the probe may be a reference electrode) and receives a voltage feedback signal from the probe 132. The controller 304 controls the voltage source 302 according to the desired voltage(s) to be applied between the anode 156 and the cathode 124 and the voltage feedback signal from the probe 132. In embodiments, the controller 304 is also communicatively coupled to the motor 152 to cause the motor 152 to rotate the stirring element 158. In the embodiment illustrated in FIG. 6, the controller, motor, and voltage source are each supplied power by different, independent power sources 306. In some embodiments, the controller 304 and voltage source 302 share a power source 306, and the motor 152 is supplied power by a separate power source 306. In yet other embodiments, a single power source 306 provides power to the voltage source 302, the controller 304, and the motor 152.

The anode 156 is positioned at a fixed distance, d1, from the porous template 122, the reference electrode 132 is fixed in a position at a constant distance, d2, from both the porous template 122 and at a fixed distance, d3, from the anode 156, the cathode 124 is fixed in a position at a constant distance, d4, from the anode 156, and the stirring element 158 is fixed in a position at a constant distance, d5, from the porous template 122 and stirs at a constant rotational velocity. In embodiments, d2 is smaller than d5, and d3 plus d2 is equal to d1. In other embodiments, d2 may be greater than d5. Due to the fixed distances of the components and the fixed speed of the stirring element 158, the uniformity of fabricated nanowire composites, and repeatability of fabricating nanowire composites with desired characteristics is improved compared to traditional methods. Maintaining the fixed distances and rotational speed across multiple fabrication sessions also allows for tuning of other parameters to achieve fabrication of a desired nanowire composite (e.g., tuning the ratio of ionic materials in the ionic fluid when generating a nanowire, tuning the amount of time of an applied voltage, the duty cycle of a pulsed applied voltage, etc.).

When the AMN composite fabrication environment 300 is employed, the chamber 102 may be filled with an ionic fluid such that the ionic fluid is communicated to the porous template 122 through the aperture 126 in the bottom wall 110, and such that the anode 156 and the stirring element 158 are immersed in the ionic fluid. A voltage may be applied between the anode 156 and the cathode 124 causing charged particles in the ionic fluid to migrate in the direction of the cathode 124 and, accordingly, toward the porous template 122 disposed between the cathode 124 and the ionic fluid. The voltage may be selected according to the ions in the ionic fluid and, specifically, may be selected to maximize the deposition of the ions into the porous template 122. The charged particles in the ionic fluid may enter the pores of the porous template 122, clinging to the walls of the pores and creating nanowire structures in the pores of the porous template 122. During the deposition of the charged particles into the porous template 122, hydrogen or other gases may be formed in the pores of the porous template 122 that may clog the pores and cause incongruities in the fabricated nanowires. However, the motor 152, rotating the driven shaft 154 and, in turn, causing the stirring element 158 to rotate, stirs the ionic fluid, perturbing any hydrogen build up and providing fresh ionic fluid solution to the pores allowing for the fabrication of more uniform nanowires in the porous template 122. As would be understood by a person of ordinary skill in the art, the term "plating" may also be used interchangeably with the terms "deposition" or "depositing" when discussing the above process of applying a voltage to an ionic fluid causing electroplating or electrodeposition of a material in the porous template 122.

Figure 7A:
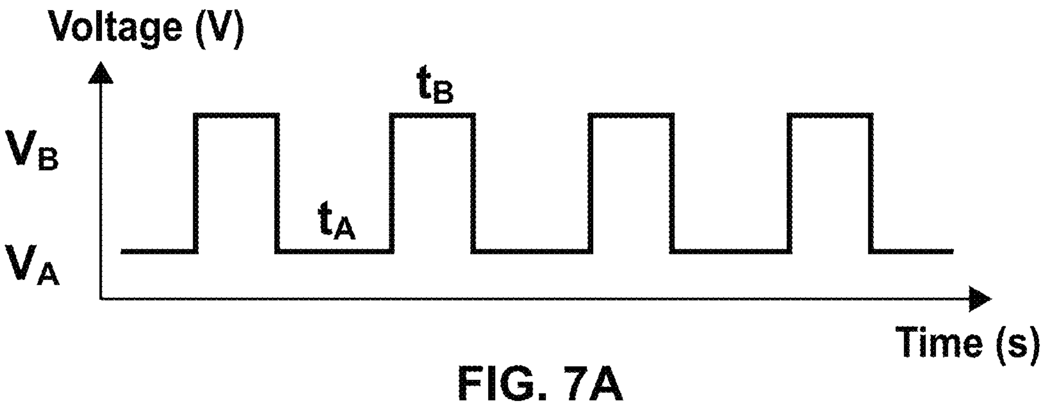
FIG. 7A is a plot of an example of a pulsed DC voltage applied to fabricate nanowires with composition that contains two elements A and B.

In embodiments, the ionic fluid may contain more than one ionic material and the applied voltage may be selected to cause more than one ionic materials to be deposited in the pores of the porous template 122. In some embodiments, the voltage may be a pulsed voltage that alternates between two or more voltages, each selected to correspond to a different one of the ionic materials, in order to fabricate alloy nanowires. FIG. 7A is a plot showing an example of a pulsed DC voltage applied over time to fabricate an alloy nanowire from ionic material A and ionic material B both in an ionic fluid solution. As is understood, different ionic materials have different threshold voltages for effecting deposition of the ionic materials. As illustrated in FIG. 7A the voltage $V_A$ is applied to plate material A into a porous template for a time $t_A$, and voltage $V_B$ is applied to plate material B into a porous template for a time $t_B$. The duty cycle of the pulsed applied voltage may determine the relative concentration of each of the ionic materials in the alloy nanowire. The overall time of the applied voltage or pulsed voltages determines the length of the nanowires in the nanowire composite.

Figure 7B:
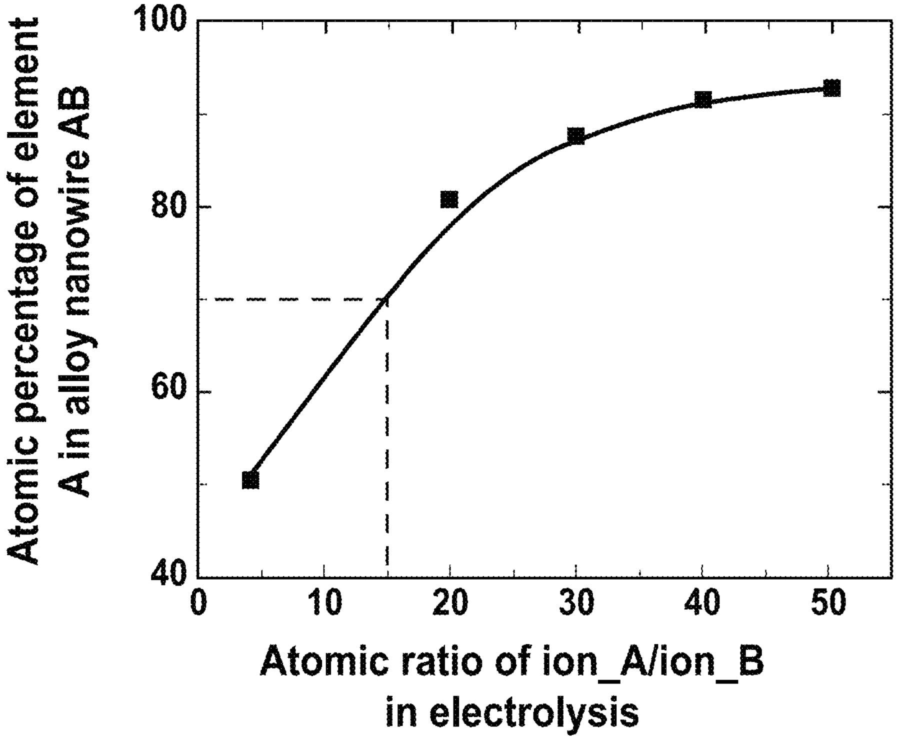
FIG. 7B is a plot illustrating the required overcompensation of ionic materials for fabrication of allow nanowires.

FIG. 7B is a plot showing the required overcompensation of ionic material A in the ionic fluid to achieve a desired elemental concentration of ionic material A in an alloy nanowire. The dotted lines show that the amount of ionic material A should be 15 times greater than the amount of material B in the ionic fluid to fabricate a nanowire with a 70% atomic percentage of material A. Together, modifying the duty cycle and voltages of the applied voltage pulse train and controlling the atomic ratio of different ionic materials in the ionic fluid, allow for the tuning of the electrical and magnetic properties of a nanowire composite device. Additionally, the applied voltage and the atomic concentration, in tandem with the constant distances of the various fabrication device components, allow for repeatability and uniform nanowire composites across multiple fabrication sessions. For example, FeNi nanowires with a concentration of $Fe_{20}Ni_{80}$ can be obtained by applying a $V_{Fe}$ of −1.2V and $V_{Ni}$ of −0.85V, $t_{Fe}$ of 0.8 seconds and $t_{Ni}$ of 1.2 seconds, and a $Ni^{2+}$ to $Fe^{2+}$ ratio of 21 in the electrolysis. It should be noted that the voltages $V_A$ and $V_B$ plotted in the pulse train of FIG. 7A, and in embodiments, are both negative value voltages In embodiments, the ionic fluid contained in the chamber 102 may contain metals such as nickel ions, silver ions, and/or copper ions, among other materials. The ionic material may be a magnetic material or combination of magnetic materials including iron, iron-nickel, cobalt, iron-nickel-cobalt, and iron-cobalt among others. In embodiments, the ionic fluid may contain more than one ionic material or any number of combinations of ionic materials.

Figure 8:
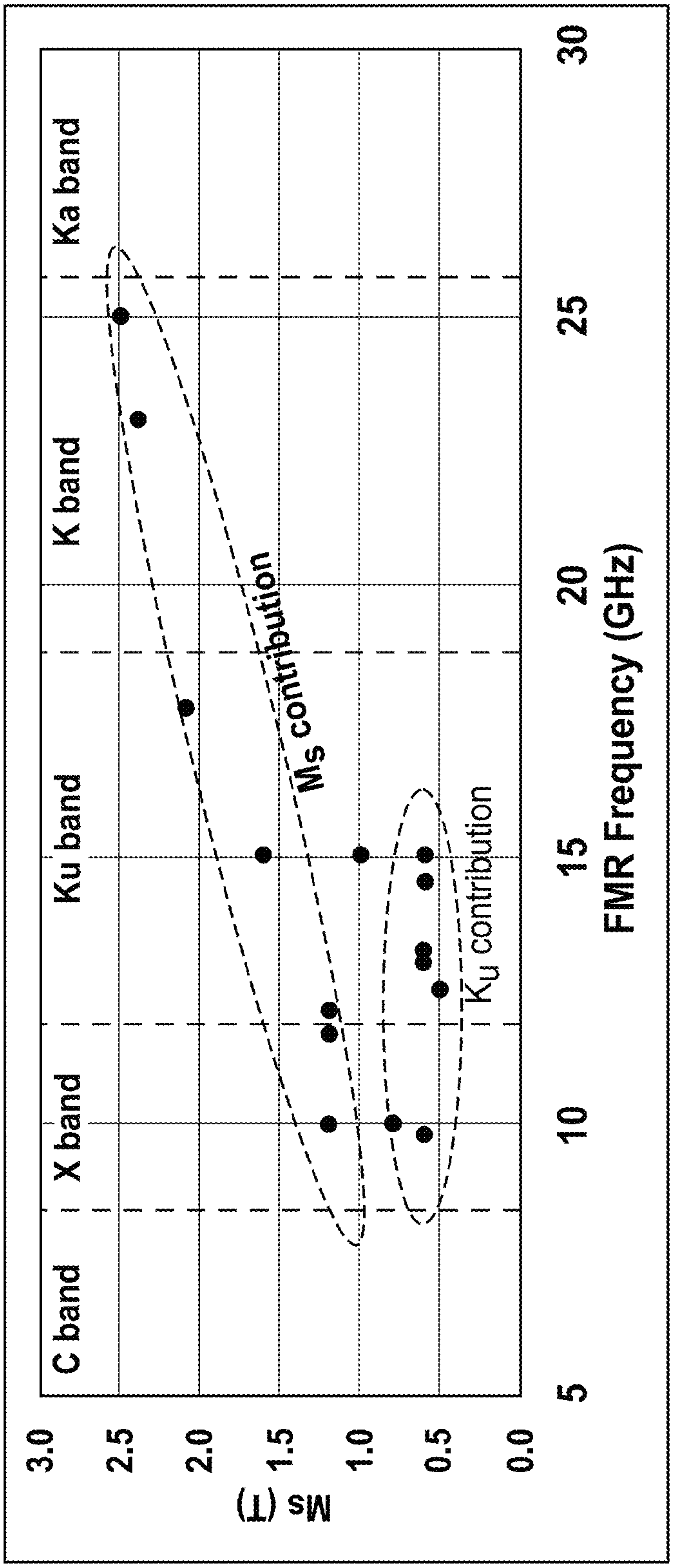
FIG. 8 is a plot of data demonstrating the ability to tune the saturation magnetization and ferromagnetic resonant frequency of an anisotropic magnetic nanowire composite.

Tuning the magnetization, FMR, FMR line width, and/or the dielectric properties of nanowire composites allows for the fabrication of devices with a wide range of operational frequencies for use in a broad range of technological fields and, in contrast with prior art methods of fabricating magnetic nanowire composite devices, can be consistently and repeatably accomplished using the devices and methods described herein. FIG. 8 is a plot of data demonstrating the ability to tune the saturation magnetization, $M_S$, and FMR of an anisotropic magnetic nanowires and magnetic nanowire composite materials. The data in FIG. 8 are generated by two different approaches for tuning the FMR of a particular AMN composite. The first approach is to tailor the saturation magnetization of the AMN composite by using different magnetic nanowire materials and/or material combinations to fabricate the nanowire as described previously. The dotted oval indicates that, by altering the nanowire material, the FMR of an AMN material may be tuned from the X-band up to nearly the Ka-band while maintaining a magnetization saturation of 2.5 T or less. The second approach to tailoring the FMR of an AMN material is by introducing magnetocrystalline anisotropy. Magnetocrystalline anisotropy is the alignment of the axes of magnetization of materials in a composite, and usually is related to the alignment of the principal axes of a crystal lattice during fabrication. Magnetocrystalline anisotropy is achieved by performing heat treatment on an AMN composite, which results in materials with high coercivities that are hard to demagnetize, often called "hard" ferromagnetic materials. Hard ferromagnetic materials are commonly used to make permanent magnets for use in any number of devices. Magnetocrystalline anisotropy helps prevent demagnetization that may occur due to external magnetic fields and thermal demagnetization among other factors. FIG. 8 shows that a magnetocrystalline anisotropy component, $K_u$, may also be used to tune the FMR of an AMN composite. The $K_u$ contribution shown in FIG. 5 allows for the tuning of the FRM frequency of an AMN composite from 10 to 15 GHz while maintaining a saturation magnetization of between 0.5 and 1 T. The methods of tuning the FMR frequency of fabricated AMN composites from 10 to 25 GHz provides the ability to fabricate components for use in RF passive devices operating between the C- and Ka-frequency bands. Combining the two approaches of using different magnetic nanowire materials, and introducing different degrees of magnetocrystalline anisotropy, may allow for further tuning of the saturation magnetization and the FMR of an AMN composite.

The electric and magnetic properties of an AMN composite are also dependent on the material that is chosen for the porous template. One porous template material may be desirable over another porous template material due to a given material's dielectric properties. Previous approaches to altering the nanowire diameter and nanowire density of an AMN composite require that a different porous template material be used for the nanowire fabrication, due to the fact that a given porous template material has distinct and discrete pore sizes and interpore distances. In contrast with previous methods, the methods described herein allow for the tuning of the pore size (i.e., nanowire diameter) and dielectric properties of any desired porous template material, providing a means for fabricating AMN composites with a broader range of electric and magnetic properties.

The tuning of an AMN composite's remanent magnetization, Mr, and MH loop squareness $M_r/M_s$ may also be performed according to the methods and devices disclosed herein. The tuning of an AMN composite's remanent magnetization may be accomplished by modifying the magnetic nanowire saturation magnetization, nanowire diameter, inter-wire distance, and nanowire magnetic anisotropy. The saturation magnetization and magnetocrystalline anisotropy may be modified by changing the nanowire material composition and heat treating the AMN composite, as discussed above. The pore diameter and interpore distance of the porous template 122 depend on the material makeup of the porous template 122 and may be limited by the material makeup of the porous template 122. For example, interpore distances of 65 nm and 125 nm are achievable in porous anodic aluminum oxide (AAO) templates, but interpore distances in the range between 65 nm and 125 nm are not readily achievable in AAO templates. Similarly, pore sizes of 50 μm and 200 μm are readily formed in AAO templates, but pore sizes in the range between 50 μm and 200 μm do not occur, due to the AAO material and fabrication processes. To fabricate nanowire composites with a wider range of nanowire diameters and inter-wire distances, the porous template 122 may be modified before electrodeposition of the ionic materials. One method for modifying the porous template is to deposit atoms on the inside of the porous template (i.e., on the walls of the pores) using atomic layer deposition (ALD), which allows for fine tuning of the pore diameters. ALD coating of same or different non-conductive materials such as oxides, nitrides, carbides, etc. may be performed to modify the pores of the porous template. Non-conductive ALD layers prevent the coating from interacting with or influencing an electric or magnetic field in the region of the porous template 122.

Figure 9:
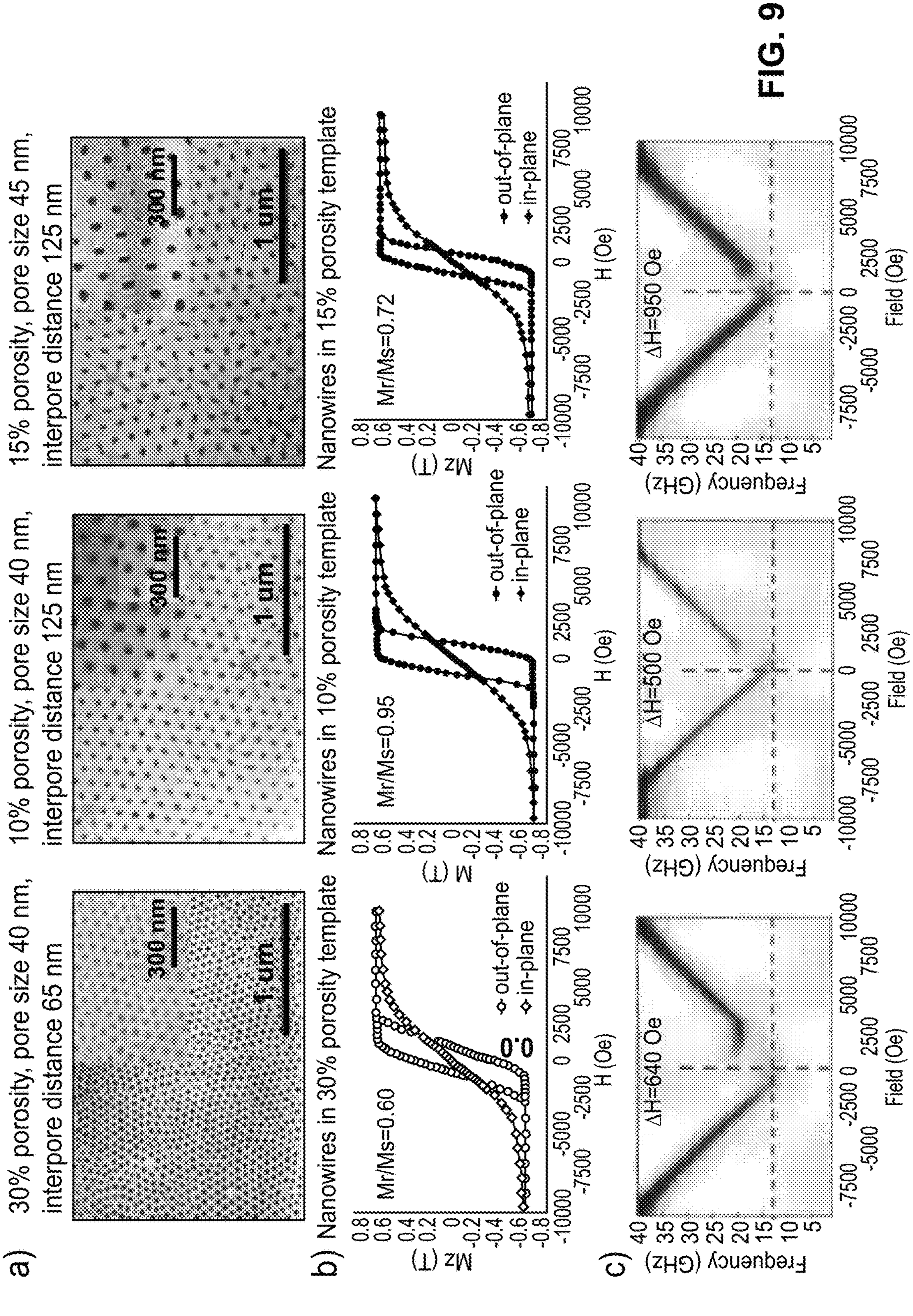
FIG. 9 is a set of scanning electron microscopy (SEM) images of porous templates with different porosity and pore size, as well as the magnetic hysteresis loops and the two-dimensional ferromagnetic resonance data of the nanowires grown in the corresponding templates.

FIG. 9 provides scanning electron microscope (SEM) images (top row) of porous AAO templates with different pore diameters and interpore distances, as well as the magnetic properties (middle row) and microwave properties (bottom row) of nanowires grown from the corresponding porous templates in each column. The porosity of the porous templates is defined as the volume of the template covered by pores, divided by the overall volume of the porous template. FeNi nanowires grown in the porous templates of FIG. 9 exhibited a higher remanence magnetization and a higher loop squareness at lower AAO porosity. The bottom row of FIG. 9 presents 2D-FMR data of the FeNi nanowires which show different FMR responses and linewidths at zero magnetic field for the different AAO templates. The cross-hairs on each of the plots in the bottom row of FIG. 9 indicate the region of the plot that shows no externally applied magnetic field, and the corresponding FMR linewidth. The three different porous templates, represented by each column of FIG. 9, exhibit different FMR linewidths, ΔH, which are reported in units of Oersteds (Oe) in the top center of each plot in the bottom row of FIG. 9.

Figure 10:
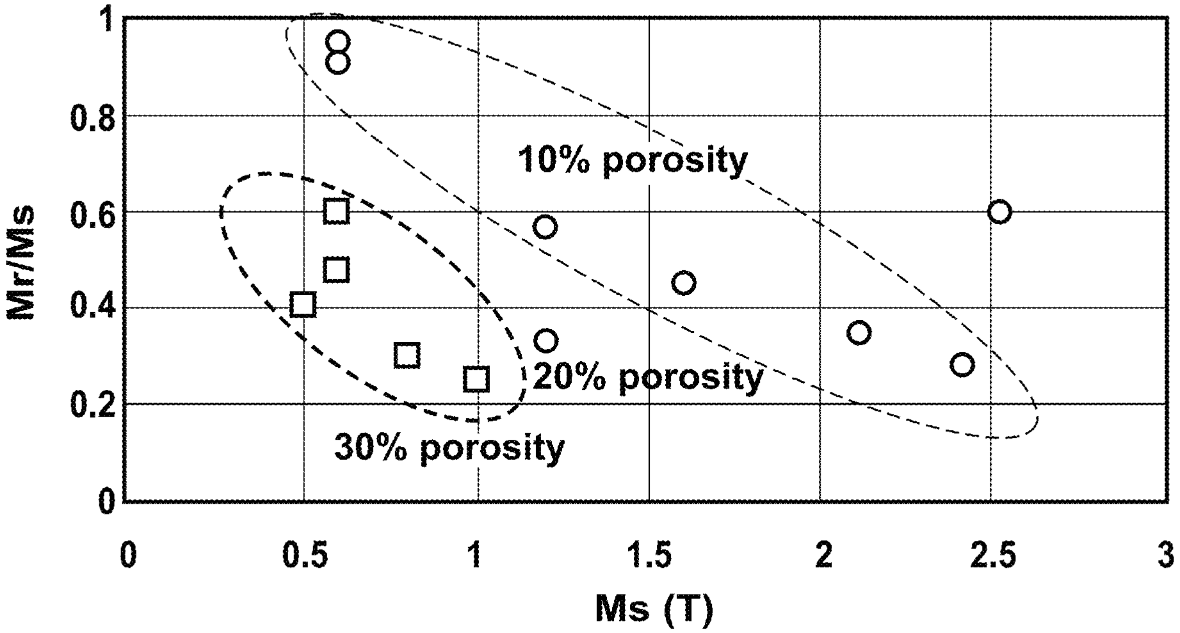
FIG. 10 is a plot illustrating the hysteresis loop squareness (i.e., the ratio of remanent and saturation magnetization, Mr/Ms) of fabricated magnetic nanowires of different saturation magnetization (Ms).

FIG. 10 is a plot showing the loop squareness of fabricated AMN composites as a function of $M_s$ and AAO template porosity. Magnetic loop squareness is a measure of how many magnetic domains are supported by a magnetic nanowire composite. Squareness is also a measure of the hysteresis of a magnet comparing the remanent magnetization of a magnet to the saturation magnetization of the magnet. Higher squareness values are desired for permanent magnets while lower squareness values mean there is less hysteresis and easier demagnetization of a magnet.

Figure 11:
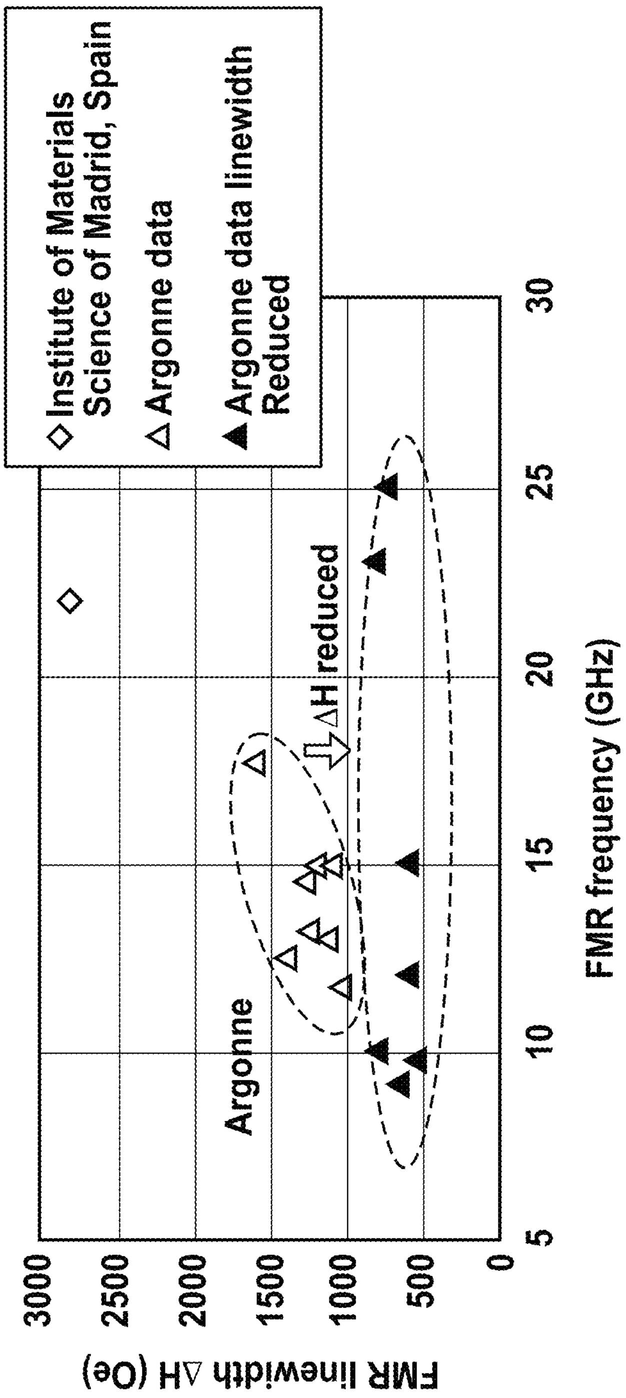
FIG. 11 is a plot demonstrating the tuning of the ferromagnetic resonant frequency linewidth of magnetic nanowires.

FIG. 11 demonstrates the ability to tune the FMR linewidth of an AMN composite by controlling the magnetic nanowire materials and compositions of alloys during fabrication of an AMN composite, and changing the porosity diameter and diameter distribution of pores of AAO templates. FIG. 11 demonstrates that the FMR can be tuned from around 10 GHz up to 25 GHz while maintaining an FMR linewidth of less than 500 Oe, providing noticeable improvement of other AMN composite fabrication technologies that report FMR linewidths of greater than 2500 Oe at FMRs less than 25 GHz.

Further, the dielectric properties of the AMN composite may be tuned by modifying the magnetic nanowire length versus the porous template thickness, as well as by controlling the template material's dielectric properties. Filling more of a nanowire pore in the porous template results in longer nanowires corresponding to larger dielectric constants. Changing the amount of time that a voltage is applied, or the duty cycle and length of applied pulsed voltages, across the anode and cathode may change the length of the nanowires. Additionally, atomic layer deposition (ALD) can be used to deposit dielectric materials into the pores of the porous template to alter or fine-tune the dielectric properties of the template to generate devices with desired electrical or magnetic properties.

While ALD is described as the method for modifying the pore diameter and interpore distance of the porous template 122, techniques such as chemical vapor deposition, thin film deposition, other form of chemical deposition, epitaxial deposition, or laser ablation may be used to modify the pore diameter and interpore distance of the porous template.

The methods and nanowire fabrication devices disclosed facilitate creation of self-biased magnetization and microwave response for use in miniaturized components, with the possibility for chip integratibility. A nanowire-based magnetic component or disk for use in RF technologies may be cut or etched from a porous template with an AMN composite. Commonly, laser etching is employed to create AMN composite disks, or magnetic nanowire disks from AMN composites in a porous template. However, the heat generated by laser etching or laser cutting has a tendency to cause demagnetization in nanowire-based magnetic components, or cause grain and grain boundary deformities resulting in less efficient devices or reduced magnetic field strengths due to the incongruities and, accordingly, is not optimal for high-performance devices. Three alternative methods of defining the shape and size of an AMN composite component for use in RF technologies include: (1) electroplating nanowires through a mask such as the aperture 126 on the bottom wall 110 or another mask that can isolate the exposure of the porous template 122 to the ionic fluid; (2) plating nanowires in an area larger than the desired size and/or geometry and etching the AMN component by chemical etchants through a mask; and (3) determining the plating region of nanowires by a cathode size and geometry. In embodiments that define the magnetic nanowire component by deposition of the cathode 124 onto the porous template 122, the conductive cathode layer may be removed through chemical etching to prevent the surface of the magnetic nanowire component from being conductive, or both sides may be covered with a non-conductive layer (e.g., through ALD coated $Al_2O_3$, or $SiO_2$ among others).

Magnetization of an AMN composite may be required for AMN based magnetic nanowire devices. As discussed previously, the saturation magnetization may be tuned through modifying the nanowire lengths and/or the magnetocrystalline anisotropy of the nanowires. An external magnetic field may be applied to an AMN composite, with the external magnetic field having a field strength greater than the saturation magnetization of the magnetic nanowires in the AMN composite component. The magnetization process described may allow for the generation of permanent magnetic components for use in compact RF devices.

Figure 12:
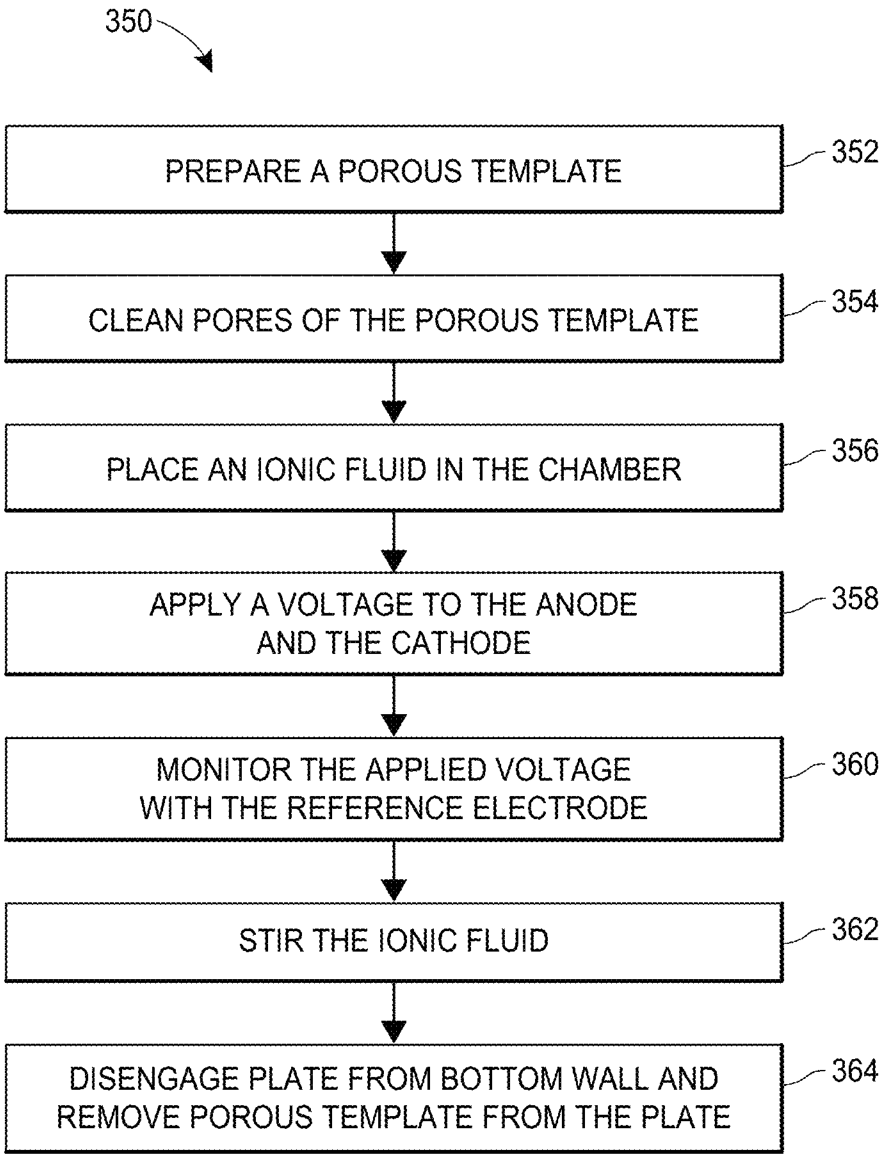
FIG. 12 is a flow diagram of a method for fabricating nanowire composites in a porous template.

FIG. 12 is a flow diagram of a method 350 for fabricating nanowire composites in a porous template. The method 350 may be performed by any of the embodiments of the systems and/or devices disclosed herein. Referring simultaneously to FIG. 1 A and FIG. 12, the method 350 includes preparing a porous template, such as the porous template 122, (block 352) which may include altering the pore diameters of pores in the porous template 122, altering the interpore distance of the pores in the porous template 122, and/or altering the dielectric properties of the porous template 122 as described herein. Preparing the porous template 122 may include plating materials onto the internal surfaces of the pores of the porous template 122 that are the same material as the porous template 122, plating materials onto the internal surfaces of the pores of the porous template 122 that are a different material than the porous template 122, plating electrically non-conductive materials onto the internal surfaces of the pores of the porous template 122, plating electrically conductive materials onto the internal surfaces of the pores of the porous template 122, and/or plating materials onto the internal surfaces of the pores of the porous template 122 that have different dielectric properties than the material of the porous template 122.

The method 350 further includes cleaning the pores of the porous template 122 (block 354). In embodiments, cleaning the pores may include rinsing the porous template 122 with water, acetone, a de-oxidizing solution, ethanol, and/or other chemicals or solutions to remove any undesired materials (e.g., residual chemicals left from template fabrication, debris, etc.) from the pores of the porous template 122. Cleaning the pores may include placing the porous template 122 in an ultrasonic bath. Additionally, cleaning the pores may include placing the porous template 122 in a liquid bath agitated by a stirring device to cause a liquid to flow across the surface of the porous template 122 and/or through the pores of the porous template 122, which may be performed in the chamber 102 of the device 100.

An ionic fluid is placed in the chamber 102 (block 356). The ionic fluid may include one type of ionic material, multiple types of ionic materials, metals, and/or other ionic materials and combinations of ionic materials as described herein. The ionic fluid in the chamber 102 is in contact with the porous template 122 through the aperture 126 in the bottom wall 110 of the chamber 102. A voltage is then applied across the anode 156 (FIG. 3A) and the cathode 124 (block 358). The applied voltage may be a pulsed voltage, a pulsed voltage that alternates between two different non-zero voltage values, a square voltage pulse, a triangular voltage pulse, a saw tooth voltage pulse, or another type of pulsed voltage pattern. Additionally, the voltage values of the pulsed voltages may be determined by multiple types of ionic materials in the ionic fluid, and the duty cycle of the pulsed voltages may be determined by a desired alloy composition of the fabricated nanowires. The voltage is monitored with the probe 132 during nanowire fabrication (block 360). The ionic fluid is stirred (block 362) by a stirring element 158 to remove any gasses or bi-products in the pores caused by the plating of the nanowires, and further to ensure that fresh ionic fluid is supplied to the pores during fabrication.

After nanowires have been plated in the porous template 122, the method 350 may further include disengaging the attachable plate 118 from the bottom wall 110 of the chamber 102, the porous template 122 may be removed from the attachable plate 118 (block 364), and the resultant AMN composite may then be magnetized.

Figure 13:
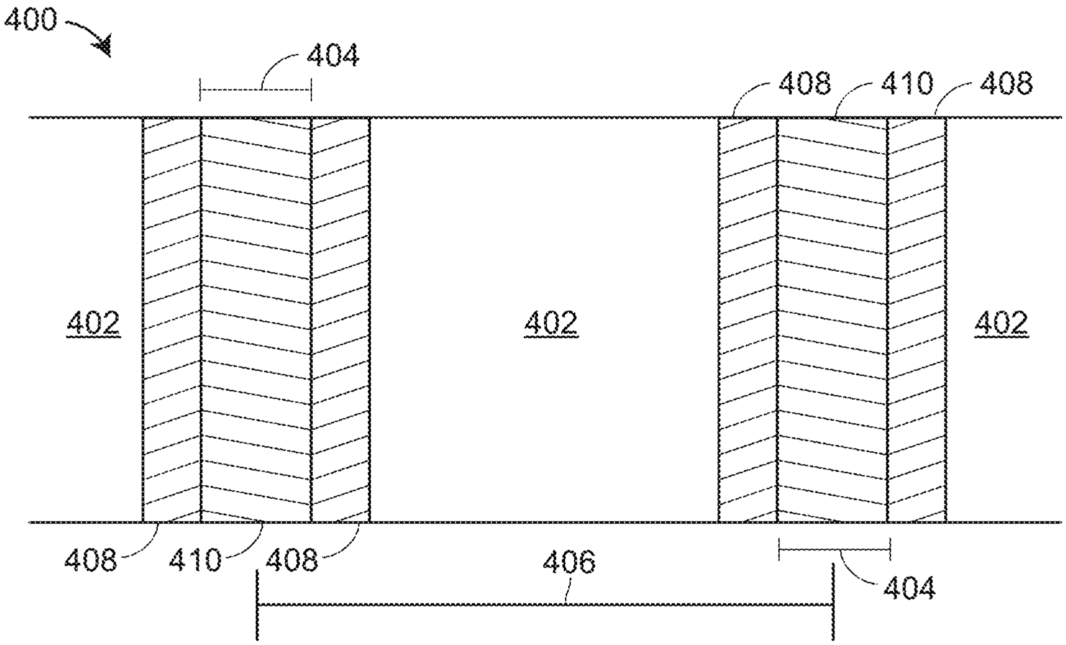
FIG. 13 is a schematic diagram depicting in cross section a structure of an anisotropic magnetic nanowire composite in a porous template according to an embodiment.

FIG. 13 is a schematic diagram depicting, in cross section, a portion of an AMN composite 400 in a porous template 402. The pores of the porous template 402 have a pore size 404 equal to the diameter of the pore, and an interpore distance 406 between the pores. As illustrated in FIG. 13, a coating layer 408 is deposited or plated onto the walls of the pores in the porous template 402. The coating layer 408 may be deposited onto the walls of the pores to alter the size 404 of the pores, the density of the pores, the interpore distance 406 of the pores, and/or to alter the dielectric properties of the AMN composite 400 as previously described herein. Nanowires 410 are deposited inside of the coating layer 408, inside the pores of the porous template 402. Some embodiments may not employ a coating layer 408 and the nanowires 410 may be deposited directly into the pores of the porous template 402 in contact with the walls of the pores of the porous template 402. In other embodiments, multiple layers of multiple materials may make up the coating layer 408 to achieve any pore size and/or dielectric properties for an AMN composite.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A system for making magnetic nanowire components, the system comprising: a chamber configured to confine an ionic fluid, the chamber having a perimeter wall and a bottom wall, the bottom wall having an aperture providing fluid communication between an interior of the chamber and an exterior surface of the bottom wall; a porous template configured such that at least a portion of a first side of the porous template is exposed to the ionic fluid through the aperture when the ionic fluid is present in the chamber; an anode disposed within the chamber at a constant distance from the first side of the porous template; a reference electrode disposed inside of the chamber through a port in the perimeter wall of the chamber, the reference electrode positioned at a fixed distance from the porous template; a cathode in contact with a second side of the porous template, the second side of the porous template being opposite the first side of the porous template, the first and second sides of the porous template being planar; a stirring element inside of the chamber, the stirring element at a constant distance from the porous template and physically coupled to a motor configured to cause the stirring element to rotate, the stirring element further being between the anode and the cathode; a voltage source electrically coupled to the anode and to the cathode and configured to apply a voltage across the anode and the cathode; and an plate selectively attachable to the exterior surface of the bottom wall, the plate aligned to the cathode and physically supporting the cathode and the porous template in relative positions at constant distances from the anode.

2. The system of aspect 1, wherein the plate is a flat surface.

3. The system of aspect 1, wherein the plate has an elevated ridge along a perimeter of the plate.

4. The system of any one of aspects 1 to 3, wherein the motor rotates the stirring element at a constant rotational speed.

5. The system of any one of aspects 1 to 4, wherein the cathode comprises a conductive layer deposited on the second side of the porous template.

6. The system of any one of aspects 1 to 5, wherein the voltage source is configured to alternate between two or more voltages based on the number of different ionic elements in the ionic fluid.

7. The system of any one of aspects 1 to 6, wherein the voltage source is configured to allow varied duty cycles between two or more non-zero voltages.

8. The system of any one of aspects 1 to 7, wherein the bottom wall has a plurality of apertures, each of the plurality apertures exposing a corresponding portion of the porous template, and wherein the cathode extends beneath each of the corresponding portions of the porous template.

9. The system of any one of aspects 1 to 7, wherein the bottom wall has a single aperture, and wherein a plurality of cathodes are positioned in contact with the second side of the porous template to create multiple magnetic nanowire components, each corresponding to one of the plurality of cathodes.

10. The system of any one of aspects 1 to 9, wherein the bottom wall is removable and replaceable with a different bottom wall having an aperture of a different size and/or shape, and/or a different number of apertures.

11. The system of any one of aspects 1 to 10, wherein the reference electrode is disposed inside of the chamber through a port in the perimeter wall of the chamber.

12. The system of any one of aspects 1 to 11, wherein the voltage source is controlled according to a feedback signal received from the reference electrode.

13. A method of making magnetic nanowire components, the method using the system of any one of aspects 1 to 12, the method comprising: preparing the porous template; cleaning the pores of the porous template; placing an ionic fluid in the chamber; applying a voltage across the anode and the cathode; monitoring the applied voltage with the reference electrode; and stirring the ionic fluid.

14. A method of aspect 13, wherein preparing the porous template comprises altering the pore diameters of pores in the porous template by depositing materials onto internal surfaces of the pores.

15. A method of aspect 13, wherein depositing materials onto the internal surfaces of the pores comprises depositing a same material as a material of the porous template.

16. A method of aspect 13, wherein depositing materials onto the internal surfaces of the pores comprises depositing a different material than a material of the porous template.

17. A method of any one of aspects 13 to 16, wherein depositing materials onto the internal surfaces of the pores comprises depositing an electrically non-conductive material onto the internal surfaces of the pores.

18. A method of any one of aspects 13 to 16, wherein depositing materials onto the internal surfaces of the pores comprises depositing an electrically conductive material onto the internal surfaces of the pores.

19. A method of any one of aspects 13 to 18, wherein depositing materials onto the internal surfaces of the pores comprises depositing a material with different dielectric properties than the dielectric properties of the porous material.

20. A method of any one of aspects 13 to 19, wherein the ionic fluid comprises multiple types of ionic materials.

21. A method of any one of aspects 13 to 20, wherein applying a voltage across the anode and the cathode comprises applying a pulsed voltage across the anode and the cathode.

22. A method of aspect 21, wherein applying a pulsed voltage across the anode and the cathode comprises applying a pulsed voltage that alternates between two or more different non-zero voltage values.

23. A method of aspect 22, further comprising selecting the two or more non-zero voltage values according to the multiple types of ionic materials.

24. A method of any one of aspects 21 to 23, further comprising varying a duty cycle of the applied pulsed voltage according to a desired proportion of elements in a nanowire.

25. A method of any one of aspects 13 to 24, further comprising disengaging the plate and removing the porous template.

26. A method of any one of aspects 13 to 25, further comprising tuning a magnetic nanowire component by at least one of: altering an interpore distance of pores of the porous template; altering a pore diameter of pores of the porous template; altering the length of nanowires; altering the microstructure of nanowires; altering the crystal structure of nanowires; altering the magnetization states of nanowires; altering a composition of magnetic nanowires formed in the porous template; and/or altering a dielectric material coating the magnetic nanowires.

27. An anisotropic magnetic nanowire composite comprising: a porous template having a pore size, a pore density, and an interpore distance; a plating layer on the walls of the pores, the plating layer being configured to alter at least one of the pore size, the pore density, and/or the interpore distance of the porous template; and a nanowire deposited on the plating layer inside the pores of the porous template.

What is claimed is:

1. A system for making magnetic nanowire components, the system comprising:

- a chamber configured to confine an ionic fluid, the chamber having a perimeter wall with a bottom surface having an aperture providing fluid communication between an interior of the chamber and an exterior of the chamber, and a flange physically coupled to the bottom surface, the flange extending circumferentially outward from and parallel to the circumference of the aperture of the chamber;
- a porous template having a pore length on the order of 100 microns, the porous template configured such that at least a portion of a first side of the porous template is exposed to the ionic fluid through the aperture when the ionic fluid is present in the chamber;
- an anode disposed within the chamber at a constant distance from the first side of the porous template;
- a reference electrode disposed inside of the chamber through a port in the perimeter wall of the chamber, the reference electrode positioned at a fixed distance from the porous template;
- a cathode in contact with a second side of the porous template, the second side of the porous template being opposite the first side of the porous template, the first and second sides of the porous template being planar;
- a stirring element inside of the chamber, the stirring element at a constant distance from the porous template and physically coupled to a motor configured to cause the stirring element to rotate, the stirring element further being between the anode and the cathode;
- a voltage source electrically coupled to the anode and to the cathode and configured to apply a voltage across the anode and the cathode; and
- a template mounting assembly comprising (i) a supporting plate selectively attachable to the flange by a plurality of fasteners spaced to provide a constant pressure and uniform electric field across the porous template and (ii) a selectively removable maskplate disposed between the supporting plate and the aperture, and wherein the supporting plate is aligned to the cathode and physically supports the cathode and the porous template between the supporting plate and the mask plate, in relative positions at constant distances from the anode.

2. The system according to claim 1, wherein the supporting plate has an elevated ridge along a perimeter of the supporting plate.

3. The system according to claim 1, wherein the motor rotates the stirring element at a constant rotational speed.

4. The system according to claim 1, wherein the cathode comprises a conductive layer deposited on the second side of the porous template.

5. The system according to claim 1, wherein the voltage source is configured to alternate between two or more voltages based on the number of different ionic elements in the ionic fluid.

6. The system according to claim 5, wherein the voltage source is configured to allow varied duty cycles between two or more non-zero voltages.

7. The system according to claim 3, wherein the aperture comprises a plurality of apertures, each of the plurality apertures exposing a corresponding portion of the porous template, and wherein the cathode extends beneath each of the corresponding portions of the porous template.

8. The system according to claim 3, wherein the aperture comprises a single aperture, and wherein a plurality of cathodes are positioned in contact with the second side of the porous template to create multiple magnetic nanowire components, each corresponding to one of the plurality of cathodes.

9. The system according to claim 3, wherein the aperture is removable and replaceable with a different aperture having a different size and/or shape, and/or a different number of apertures.

10. The system according to claim 1, wherein the voltage source is controlled according to a feedback signal received from the reference electrode.

11. The system according to claim 1, wherein the ionic fluid comprises a magnetic material.

12. The system according to claim 1, wherein the chamber further comprises a bottom wall, wherein the bottom wall comprises the aperture and the aperture provides fluid communication between an interior of the chamber and an exterior surface of the bottom wall.

13. A method of making magnetic nanowire components, the method using the system of claim 1, the method comprising:

preparing the porous template;

cleaning the pores of the porous template;

placing an ionic fluid in the chamber;

applying a voltage across the anode and the cathode;

monitoring the applied voltage with the reference electrode; and stirring the ionic fluid.

14. A method according to claim 13, wherein preparing the porous template comprises altering the pore diameters of pores in the porous template by depositing materials onto internal surfaces of the pores.

15. A method according to claim 14, wherein depositing materials onto the internal surfaces of the pores comprises depositing an electrically non-conductive material onto the internal surfaces of the pores.

16. A method according to claim 14, wherein depositing materials onto the internal surfaces of the pores comprises depositing an electrically conductive material onto the internal surfaces of the pores.

17. A method according to claim 13, wherein the ionic fluid comprises multiple types of ionic materials.

18. A method according to claim 13, wherein applying a voltage across the anode and the cathode comprises applying a pulsed voltage across the anode and the cathode.

19. A method according to claim 13, further comprising tuning a magnetic nanowire component by at least one of:

altering an interpore distance of pores of the porous template;

altering a pore diameter of pores of the porous template;

altering the length of nanowires;

altering the microstructure of nanowires;

altering the crystal structure of nanowires;

altering the magnetization states of nanowires;

altering a composition of magnetic nanowires formed in the porous template; and/or altering a dielectric material coating the magnetic nanowires.

* * * * *